US005227004A

United States Patent [19]

Belger

[11] Patent Number: 5,227,004

[45] Date of Patent: Jul. 13, 1993

[54] METHOD AND APPARATUS FOR PRODUCING LAMINATED MATERIAL

[75] Inventor: Melvin R. Belger, Woodland Hills, Calif.

[73] Assignee: Graphic Technology Systems, Inc., Los Angeles, Calif.

[21] Appl. No.: 670,244

[22] Filed: Mar. 15, 1991

[51] Int. Cl.[5] ........................... B65C 7/00; B32B 31/00

[52] U.S. Cl. .................................... 156/552; 156/565; 156/572; 271/95; 271/98; 271/106

[58] Field of Search ............... 156/505, 552, 565, 570, 156/555, 556, DIG. 29, DIG. 30, DIG. 31, 572; 271/94, 95, 98, 106

[56] References Cited

U.S. PATENT DOCUMENTS

| | | | |
|---|---|---|---|
| 1,714,265 | 5/1929 | Gurwick | 156/277 |
| 1,818,459 | 8/1931 | Bryan | 156/277 |
| 3,022,207 | 2/1962 | Lang | 156/270 |
| 3,032,463 | 5/1962 | Morgan | 156/268 |
| 3,295,654 | 1/1967 | Clinton | 156/577 |
| 3,749,626 | 7/1973 | Buck | 156/510 |
| 3,836,139 | 9/1974 | Shimizu | 271/98 X |
| 3,956,049 | 5/1976 | Johnsen | 156/267 |
| 3,995,791 | 12/1976 | Schoppee | 156/505 X |
| 3,997,384 | 12/1976 | Kuring | 156/269 |
| 4,081,309 | 3/1978 | Jenkins | 156/268 |
| 4,463,942 | 8/1984 | Newsome | 271/98 X |
| 4,594,125 | 6/1986 | Watson | 156/516 |
| 4,627,605 | 12/1986 | Roller et al. | 271/98 X |
| 4,756,790 | 7/1988 | Kinnunen | 156/505 X |
| 4,882,004 | 11/1989 | Watson | 156/552 X |
| 4,925,520 | 5/1990 | Beaudoin et al. | 156/552 X |

*Primary Examiner*—David A. Simmons
*Assistant Examiner*—James J. Engel, Jr.
*Attorney, Agent, or Firm*—Poms, Smith, Lande & Rose

[57] ABSTRACT

A method and apparatus is disclosed for laminating sheet material having a width together with at least one laminate web material having an adhesive coating on one side thereof. The laminating machine has upper and lower laminating rolls for producing therebetween a continuous laminated web comprising the sheet material and the web material fed between the laminating rolls. A laminate web material supply supplies material to the laminating rolls. Die cutting apparatus separates the continuous laminated web from the laminating rolls into individual laminated sheets, and an output area stacks the individual laminated sheets after they are separated. Apparatus is provided for pressing substantially the entire width of a marginal portion of a piece of sheet material to be laminated to the adhesive coating on the laminate web material.

32 Claims, 13 Drawing Sheets

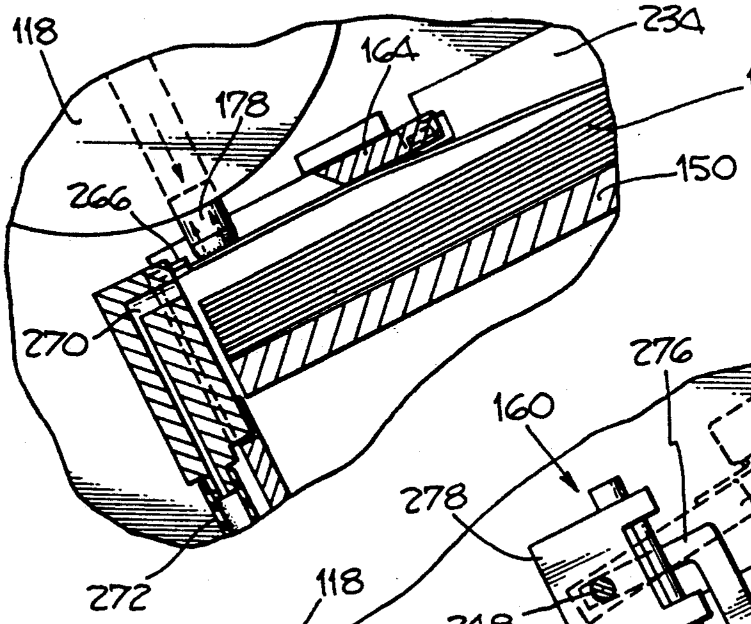
Fig. 6.
Fig. 7.
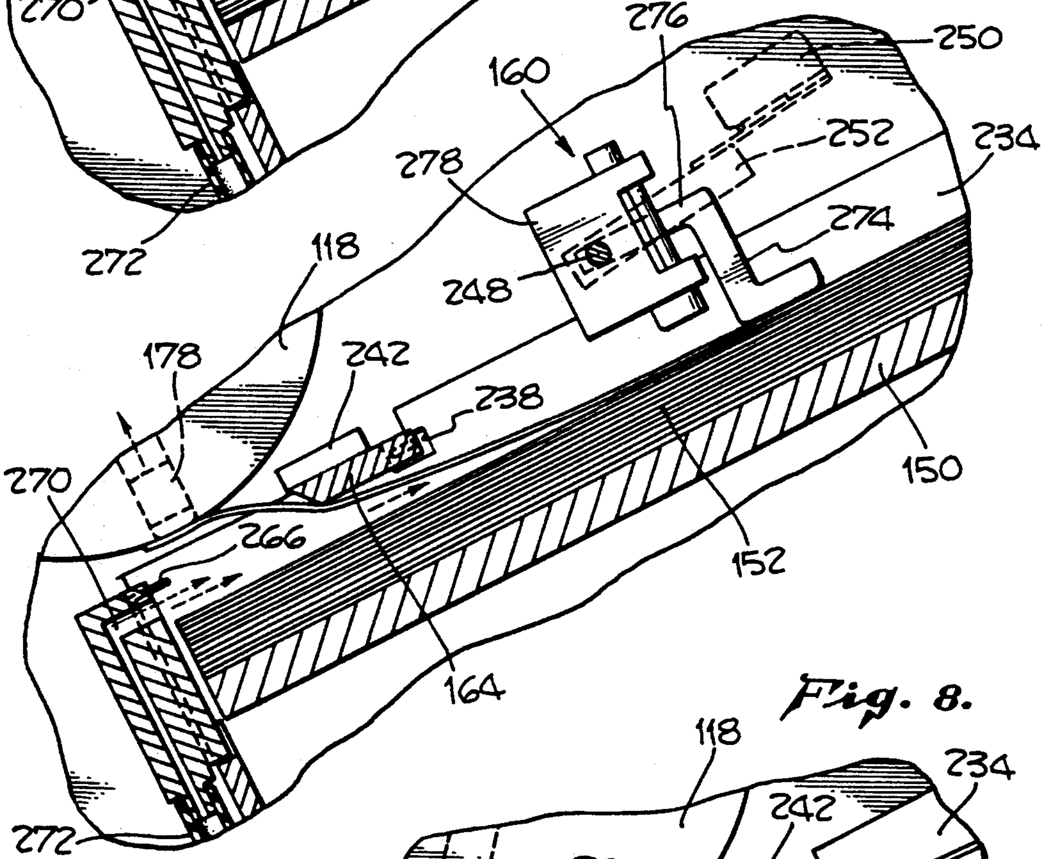
Fig. 8.
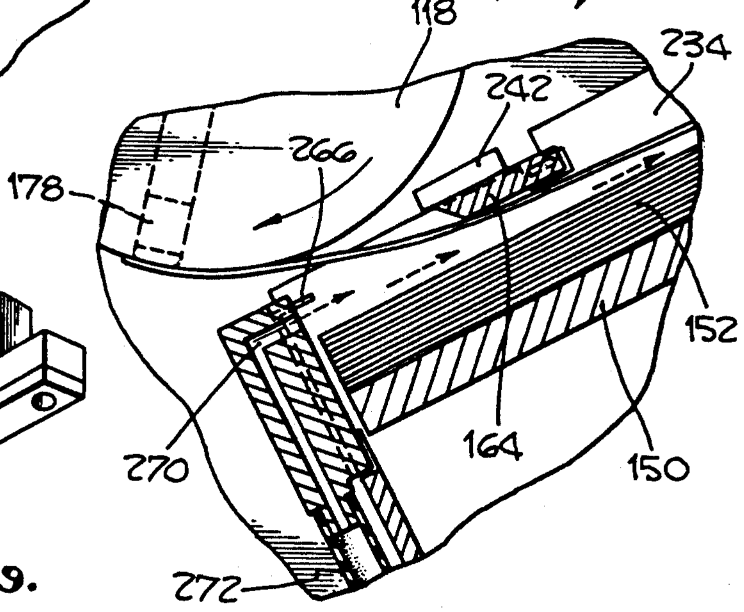
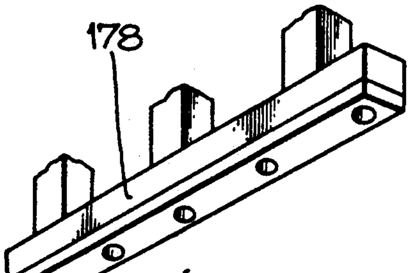
Fig. 9.

Fig. 11.
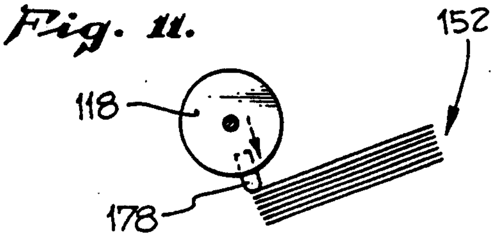
Fig. 10.
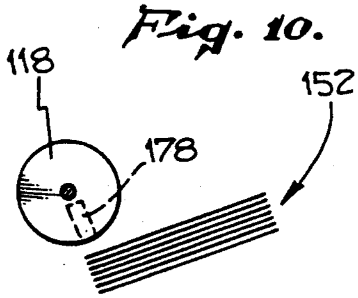
Fig. 13.
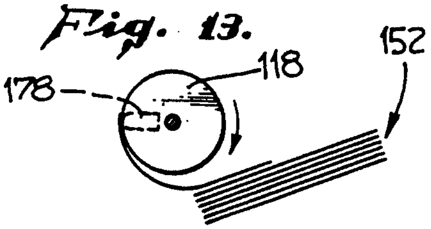
Fig. 12.
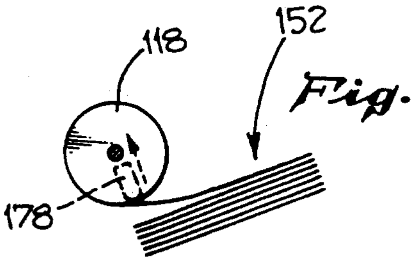
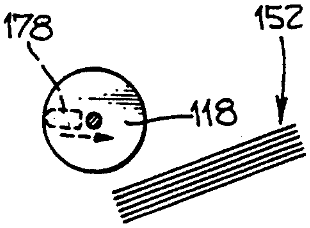
Fig. 14.
Fig. 15.
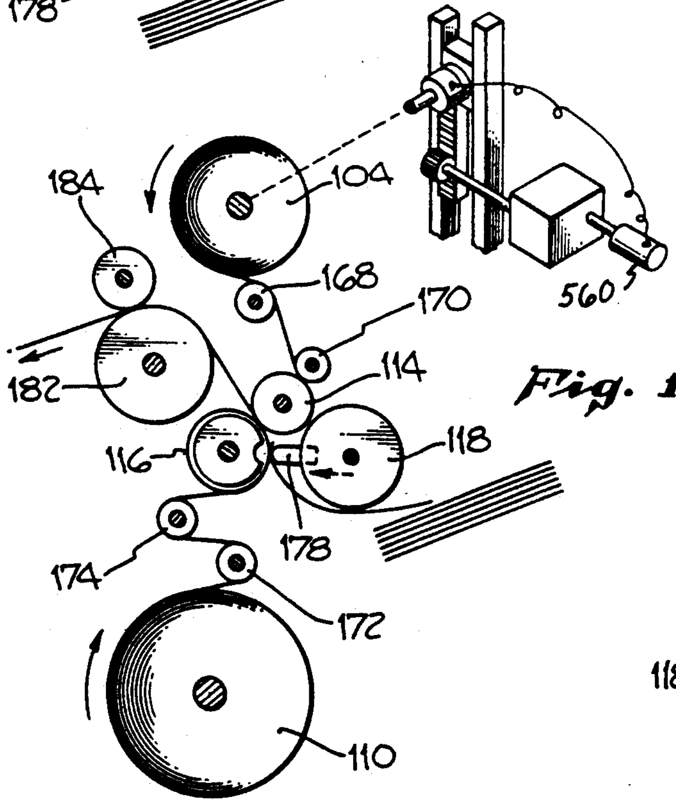
Fig. 16.
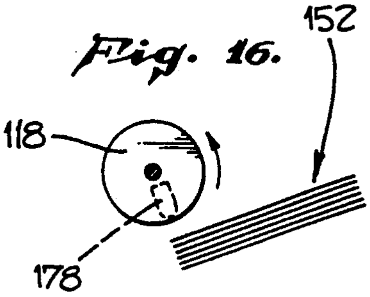

Fig. 22.
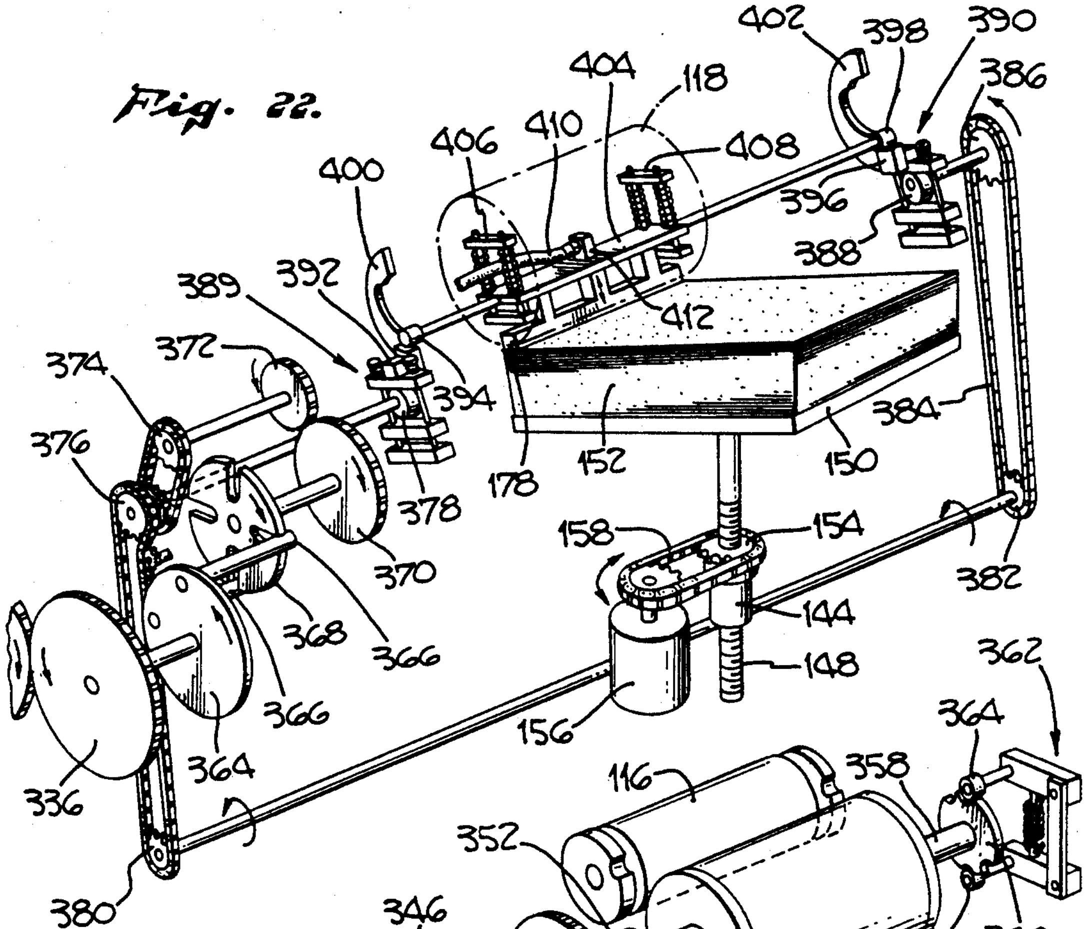
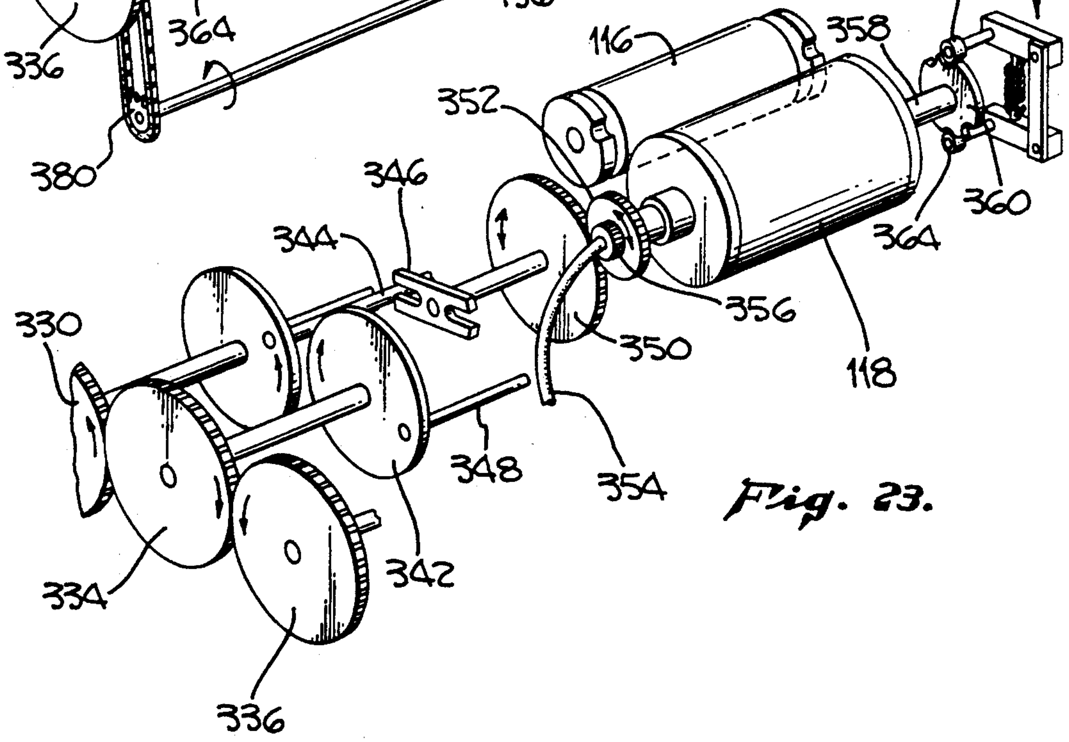
Fig. 23.

Fig. 27.
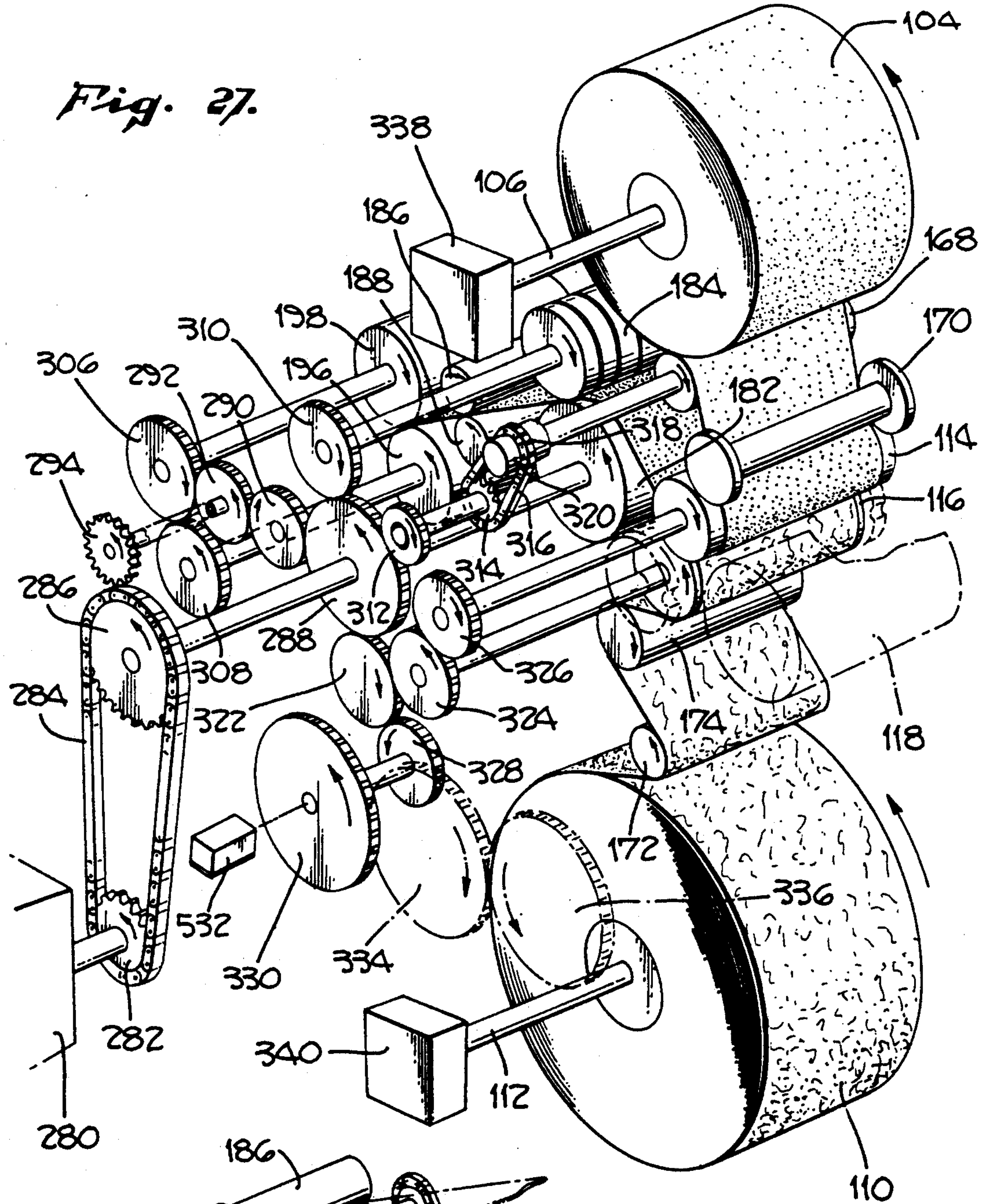
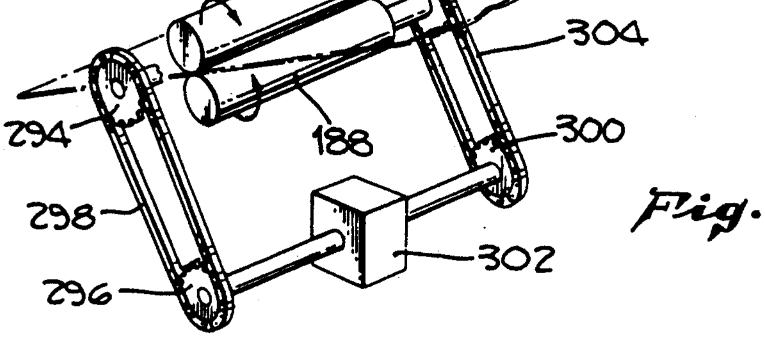
Fig. 28.

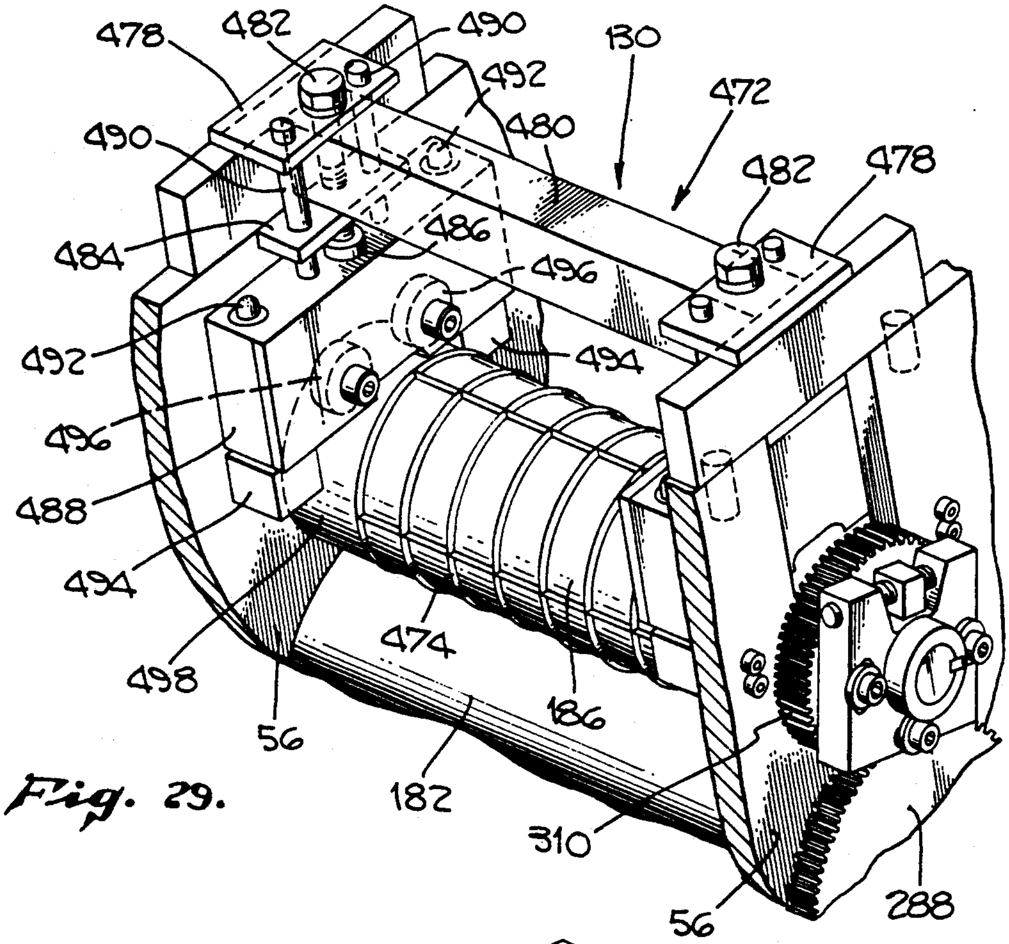
Fig. 29.
Fig. 30.
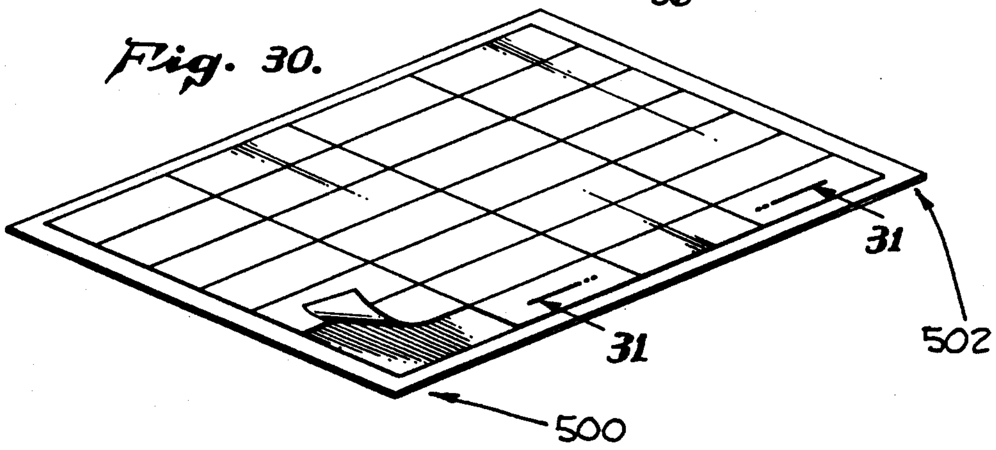
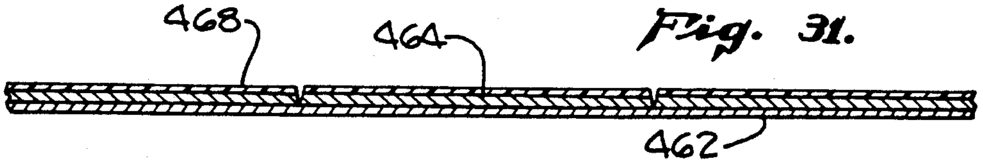
Fig. 31.

METHOD AND APPARATUS FOR PRODUCING LAMINATED MATERIAL

BACKGROUND OF THE INVENTION

1. Field Of The Invention

The present invention relates to improved methods and apparatus for producing laminated material, such as for feeding and processing raw stock material for laminating and processing the laminated stock material to produce individual sheets of laminated printed labels.

2. Related Art

Apparatus are known for making laminated labels having a central substrate layer of printable material disposed between first and second clear cover layers and a backing layer. Such an apparatus is described in U.S. Pat. No. 4,594,125, to Watson. The Watson patent describes a machine which is said to be fully automated for operation by a single person. The machine includes a bin for holding a supply of substrate material and a feeder mechanism for feeding substrate material from the bin in a forward direction for travel along a path through the apparatus. Rolls of web material are combined with the substrate as the substrate material is fed forwardly to form a laminated strip of label material. Die cutters are provided downstream for cutting through the substrate and cover layers of the laminated strip to form individual labels on the backing layer. The laminated strip is then cut into separate sheets and output to a holding bin. The feeding mechanism may be a vacuum-grip feeder device having a pair of sucker arms operable for feeding individual sheets lengthwise one after another at a uniform rate from the top of the stack to the nip of a pair of relatively small diameter rollers. The rollers feed the sheets forward in the path. The sheets are squared up relative to their path by a rotary cam downstream from the feed rollers. The movement of the sucker arm, feed rollers and rotary cam are synchronized through suitable gears. Combining rolls receive the substrate material from the feed mechanism to combine the substrate and web materials. The labels are then cut and individual sheets separated from the laminate web material and pass by a conveyor belt to drop into a bin at the output.

The Watson machine lacks a precise and repeatable mechanism for placing the substrate material at a desired position between the web materials for forming the laminate. As a result, cutting the laminated web material may occur at different locations on the substrate material or sheet causing the resulting label sheets to have a non-uniform configuration. Additionally, continued operation of the machine with misregistration may result in cutting the individual sheets in the middle of a set of labels.

The Watson machine also lacks a reliable mechanism for insuring efficient and reliable pick-up of single sheets only of substrate material. The Watson machine also may be subject to improper stacking of separated sheets in the holding bin as a result of such effects as static electricity on the sheets, stretching or bending of individual layers of the laminated material, and the like.

There is, therefore, a need for an improved laminating apparatus which provides for uniform, reliable feeding of individual label sheets, proper control of laminate web tension, improved output of laminated sheets and improved processing overall for creating individual sheets of laminated material. There is a need for an apparatus which can place the substrate material in a precise known predetermined location on the laminate web material without having to constantly monitor the machine output and make adjustments to the timing or the speed of the machine. There is further a need for an apparatus which can produce individual sheets of laminated material by cutting the sheets uniformly at a known location on the web material relative to the dimensions and boundaries of the substrate sheet material. There is also a need for an apparatus which can cut the laminated web material into individual laminated sheets without regard to where the end of the laminated sheet occurs relative to the next succeeding sheet of label material.

SUMMARY OF THE INVENTION

In accordance with the present invention, a laminating machine is provided which has uniform, repeatable feeding and placement of individual sheets of substrate or label material, which can cut the laminated material at precise and predetermined locations on the laminated web material relative to the start location of an individual sheet of substrate or laminated material, and which has improved features for laminating and providing individual sheets of laminated material. Specifically, in a laminating machine for laminating sheet material having a width together with at least one laminate web material having an adhesive coating on one side thereof, the laminating machine has upper and lower laminating means for producing therebetween a continuous laminated web comprising the sheet material and the web material being fed between the laminating means. Means are provided for supplying the laminate web material to the laminating means. Means are also provided for separating the continuous laminated web from the laminating means into individual laminated sheets. Means are included for stacking the individual laminated sheets after they are separated. Means are further provided for pressing substantially the entire width of a marginal portion of a piece of sheet material to be laminated to the adhesive coating on the laminate web material. By pressing the marginal portion of a piece of sheet material substantially the entire width thereto to the adhesive coating on the laminate web material, the present invention can provide a uniform and precise positioning of the sheet material on the laminate web material to be laminated into a continuous laminated web. The continuous laminated web can then be separated into individual sheets by cutting the continuous web material at a precise, predetermined location relative to the starting point of an individual piece of sheet material, irrespective of the particular location of the end of the preceding piece of sheet material.

In one form of the invention, the pressing means may include a vacuum pick-up bar for picking up an individual sheet of material and pressing the individual sheet of material onto the adhesive coating. The vacuum bar provides for uniform pick-up of individual sheets of material and consistent transport of the sheet to the laminate web material onto which the marginal portion of the sheet material is pressed. For example, where each sheet is 11 inches long, for example for 8½ by 11 inch paper, the leading marginal edge is pressed against the adhesive coating on the laminate web material at 11 inch increments. As a result, the resulting continuous laminated web material can then be cut precisely at the leading edge of the marginal edge portion, regardless of the particular location of the trailing edge of the immediately preceding sheet of material. For example, the trailing edge may be displaced relative to a given 11 inch segment of laminate web material as a result of shrinking or stretching or other causing of non-uniformity. However, since the leading edge of the given sheet typically does not suffer from such malformation, cutting the continuous laminated web material at the leading edge of each sheet results in uniform individual sheets of laminated material. In a preferred embodiment, the vacuum bar includes five vacuum ports evenly distributed transversely along the base of the vacuum bar for applying a vacuum to the leading marginal edge portion of the top sheet of paper in a stack of paper stock. The vacuum bar preferably includes a rubber strip at the point of contact by the vacuum bar with the sheet paper. This width wise contact provides for uniform pick-up and transport of an individual sheet of material, and also provides uniform pressing or tacking of the sheet onto the adhesive layer.

In a further preferred embodiment of the present invention, the separate sheets of laminated material can be stacked uniformly in an output bin by outputting the sheets over an output bin and over a layer of air blown underneath the sheet so that each sheet floats evenly down onto the top of the stack without jamming.

In accordance with another embodiment of the present invention, a pivotable weight bar is provided on the input or feed sheet holding bin to create uniform feed of single sheets of substrate material. Additionally, air jets and separator fingers may be provided to insure uniform and complete separation of the top sheet of material from the stack for tacking onto the adhesive coating.

Other features of the present invention will be apparent from the following brief description of the drawings and detailed description of the preferred embodiments.

BRIEF DESCRIPTION OF THE DRAWINGS

FIG. 6 is a detailed side section of a portion of the holding bin and sheet separator assembly taken along line 6—6 of FIG. 4 showing a single sheet picked-up from the holding bin by the vacuum bar of a vacuum roll according to one aspect of the present invention.

FIG. 7 is a partial side section of the holding bin and sheet separator assembly of FIG. 4 similar to that of FIG. 6 showing operation of the sheet separator assembly and removal of a single sheet.

FIG. 8 is a partial detailed side section of the holding bin and sheet separator assembly showing withdrawal of a single sheet from the holding bin.

FIG. 9 is a bottom prospective view of a vacuum bar for use in the vacuum roll of the present invention.

FIG. 10 is a schematic representation of a stack of pre-printed sheets to be laminated adjacent a vacuum roll and vacuum bar assembly for purposes of illustrating removal of a sheet.

FIG. 11 is a schematic representation similar to that of FIG. 10 showing activation of the vacuum bar to pick up a single sheet.

FIG. 12 is a schematic representation similar to that of FIG. 10 showing retraction of the vacuum bar and a marginal edge of a sheet along with it.

FIG. 13 is a schematic representation similar to that of FIG. 10 showing rotation of the vacuum roll and partial withdrawal of the lifted sheet from the stack of sheets.

FIG. 14 is a schematic representation similar to that of FIG. 10 showing retraction of the vacuum bar after releasing the accompanying sheet.

FIG. 15 is a schematic representation of the vacuum roll, raw stock supply and laminating apparatus and showing tacking of a leading edge of the sheet to one portion of the raw laminating stock.

FIG. 16 is a schematic representation similar to that of FIG. 10 showing re-rotation of the vacuum roll.

FIG. 22 is a schematic representation of a drive mechanism for operating the vacuum bar to lift a sheet from the holding bin.

FIG. 23 is a schematic representation showing a drive mechanism for rotating the vacuum roll.

FIG. 27 is a schematic representation of the drive mechanism for taking raw laminating stock, laminating the raw sheet stock, die-cutting the labels and producing individual sheets.

FIG. 28 is a schematic representation of the drive rollers and a clutch mechanism which are part of the mechanism of FIG. 27.

FIG. 29 is a perspective view of a portion of a label die-cutting assembly according to the present invention.

FIG. 30 is a perspective view of a sheet of labels formed by the die-cutting assembly of FIG. 29.

FIG. 31 is a side section of the sheet of labels of FIG. 30 showing the laminated sheets and cuts formed therein.

DETAILED DESCRIPTION OF THE PREFERRED EMBODIMENTS

Figure 2:
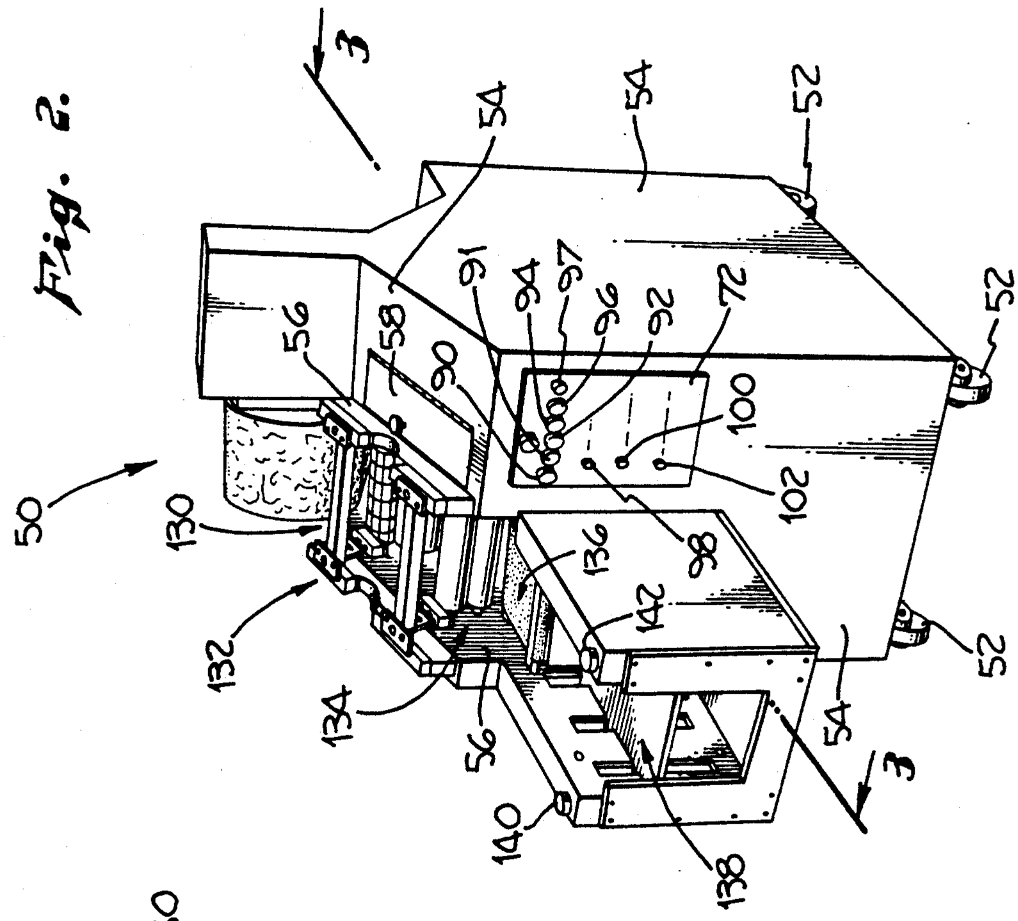
FIG. 2 is a rear isometric perspective view of the apparatus of FIG. 1.
Figure 1:
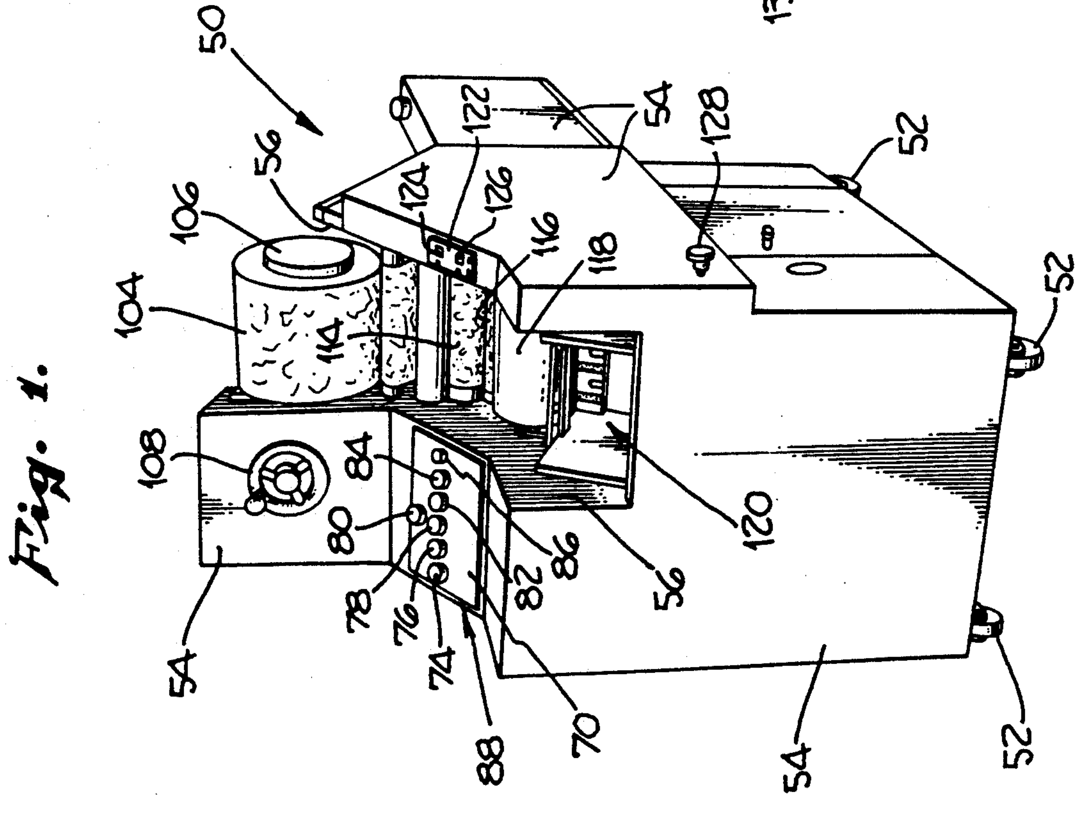
FIG. 1 is a front isometric perspective view of an improved apparatus for producing sheets of laminated printed labels according to the present invention.

In accordance with the present invention, an improved method and apparatus for producing laminated material such as individual label sheets is described having improved sheet feeding characteristics, improved lamination with uniform sheet placement and improved laminated sheet output. In one preferred embodiment of the invention, for purposes of illustration, a laminating machine 50 (FIGS. 1 and 2) is mounted on a plurality of casters 52 for portability and maneuverability. Much of the electronic circuitry and drive mechanisms for the machine are enclosed within the machine by various panels 54 for protecting the internal workings of the machine. The panels are mounted to an alloy frame 56, part of which is shown in FIGS. 1 and 2. Various doors provide access to parts of the machine that need to be accessed more often than others. A gear access door 58 on the upper rear of the machine provides access to various gears and mounting assemblies for pull rollers, the sheeter die and base rolls and other rolls in the machine. A roll cover panel (not shown) is normally mounted over the die rolls during operation.

A front control panel 70 and a rear control panel 72 include various switches and indicator lights for operating the laminating machine. The front control panel includes a run switch 74, a stop switch 76, a master switch 78, a jog switch 80, an auto registration switch 82, and a vacuum off switch 84. The front control panel further includes a speed control potentiometer ("pot") for controlling the speed of throughput of the machine. The rear control panel 72 includes a stop switch 90, a jog switch 92, a run switch 94, and a vacuum off switch 96. The rear control panel further includes a top laminate unwind tension control or potentiometer 98, a bottom laminate unwind tension control 100, and a pull roll tension control 102 for adjusting tension from roll to roll, since rolls may be wound differently than others. These switches and controls have their usual functions, namely the run switch starts the continuous operation of the laminating machine, the stop switch terminates its operation, the master switch 78 supplies power to all of the electronics, including the operating switches, the jog switch incrementally advances the laminating machine in incremental steps, the auto registration switch operates the machine until a label die-cutting roll reaches a certain predetermined rotational position and the vacuum off switch turns off a vacuum pump. The top laminating unwind tension potentiometer adjusts the tension or drag on the top laminate unwind roll while the bottom laminate unwind tension potentiometer adjusts the tension or drag on the bottom laminate unwind roll. The pull roll tension potentiometer adjusts the tension or pull developed by a pair of pull rolls in the machine. Each of these components will be discussed more fully below.

The laminating machine includes a top laminate roll 104 mounted on a top spool 106. The spool is manually movable upwardly and downwardly in a vertical plane by a height adjustment wheel 108. A bottom laminate roll 110 (FIG. 3) is mounted on a bottom laminate spool 112. Each spool plays out a respective top and bottom laminate web material about appropriate subsidiary rolls to a pair of laminating rolls, a top laminating roll 114 and a bottom laminating roll 116, partially shown in FIG. 1. A vacuum roll 118 takes a sheet of pre-printed paper or other information containing medium from the sheet holding bin and feed assembly 120 which contains a stack of sheet paper (not shown). The sheet paper is preferably preprinted sheets of labels which will be removable after laminating but may be other media as well. The height and movement of the stack is controlled by a sheet stack control panel 122 having an up switch 124 and a down switch 126 for raising and lowering the level of the sheet stack. A lateral position adjustment knob 128 controls the lateral position of the sheet holding and feed assembly relative to the rest of the machine. As described more fully below, the vacuum roll 118 picks up an individual sheet of pre-printed paper and tacks a leading marginal edge of the paper to an adhesive coated side of the bottom laminate web material before being interposed between the bottom and top laminating web material and inserted between the top and bottom laminating rolls.

Down stream from the laminating rolls, the web is passed through a web cutting label die assembly 130 (FIGS. 2 and 3) for cutting labels in the laminate by cutting the top laminate and the pre-printed paper while leaving the bottom laminate sheet uncut. The labels can then be removed from the bottom laminate. The laminate sheet is then passed through a pull roll assembly 132 and then through a sheeter die base roll assembly 134 (FIGS. 2 and 3).

Downstream from the sheeter roll assembly, an output sheet conveyor 136 takes individual sheets and passes them to an output sheet tray 138 having a tray up switch 140 and a tray down switch 142 for selectively moving the output sheet tray up or down.

Figure 3:
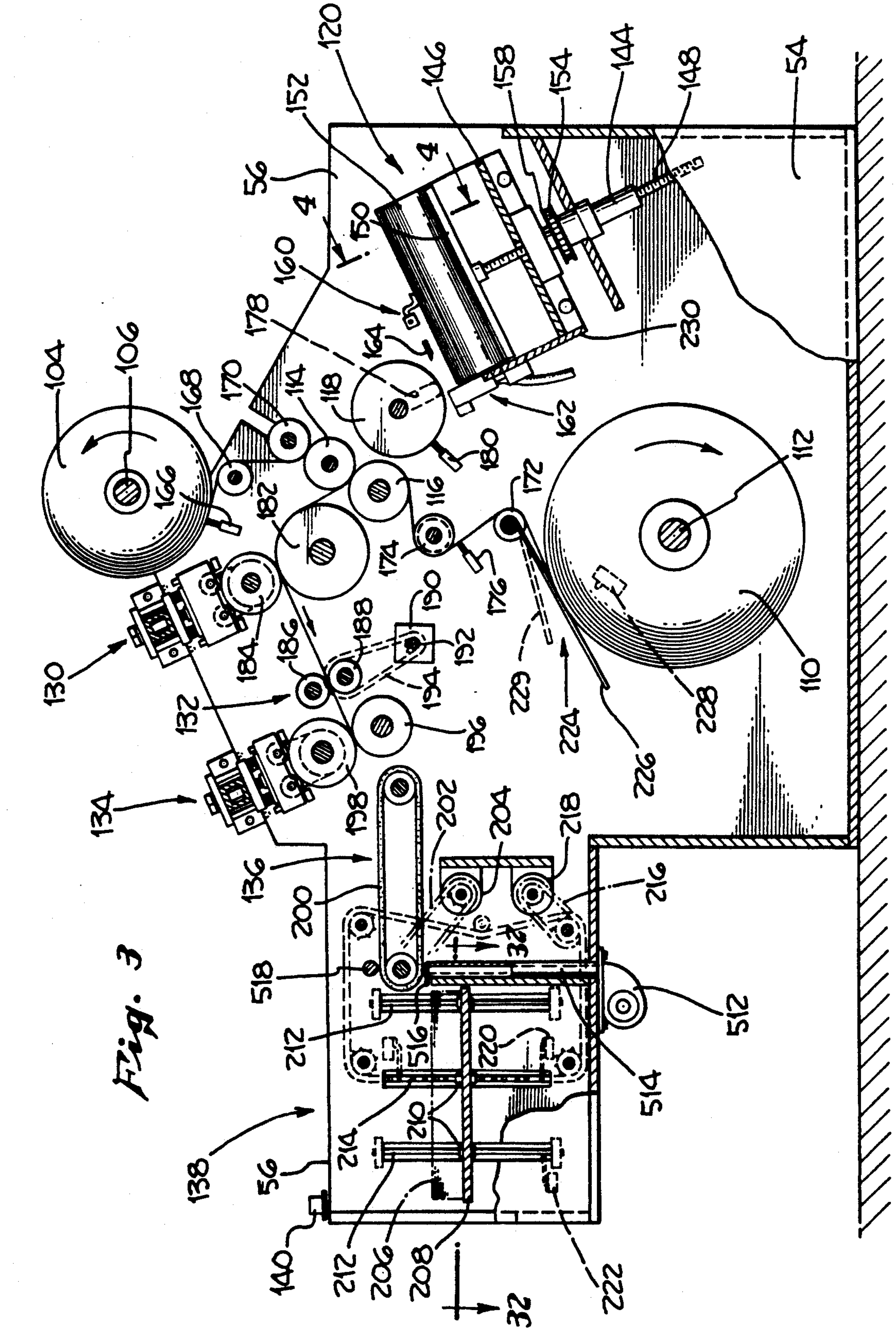
FIG. 3 is an elevational sectional view of the left side of the apparatus of FIG. 2 taken along the lines 3—3 showing the path of processing raw stock material and producing individual sheets of laminated labels.

Considering the mechanical structure in more detail, with respect to FIG. 3, the sheet holding and feed assembly 120 includes a jack screw 144 mounted to a base 146 of the sheet holding bin and feed assembly. The jack screw includes a threaded screw element 148 extending through the base 146 to a sheet support plate 150 for supporting a stack of pre-printed sheets of paper or other information bearing material 152 to be laminated in the machine. The sheet support plate 150 is raised and lowered through a sprocket 154 driven by a motor 156 (FIG. 22) and a chain 158. Coarse movement of the sheet support plate 150 is controlled through the motor 156 by the tray up and tray down switches 140 and 142, respectively. Fine adjustment of the sheet stack 152 is accomplished through a sheet level assembly 160 which senses a decreased sheet stack level and activates the motor 156 to raise the sheet stack by raising the sheet support plate 150. A sheet separator assembly 162 is adjustably mounted to the forward or downstream portion of the sheet holding and feed assembly 120 for separating individual sheets from the stack when picked up by the vacuum roll 118, as described more fully below. A floating paper hold down plate assembly 164 (in more detail in FIG. 5) spans the width of the sheet holding and feed assembly to assist in the separation of individual sheets from the stack.

The top laminate roll 104 passes a continuous top laminate sheet from the top laminate roll 104 in a counterclockwise direction as shown in FIG. 3 around the spool 106. The top laminate layer includes an adhesive layer on the side of the layer facing inwardly toward the spool 106. The top laminate layer passes along a brush element 166 for removing any residual electrostatic charge on the sheet. The top laminate layer passes over an assist roll 168 to properly tension and assist in the removal of the top laminate from its roll. The top laminate then passes over a guide roll 170 for guiding the top laminate to the top laminating roll 114, which rotates in a clockwise direction. The assist roll 168 rotates in a clockwise direction, while the guide roll 170 rotates in a counterclockwise direction.

The bottom laminate roll 110 rotates in a clockwise direction around spool 112 and delivers the bottom laminate, which preferably is a waxy bottom layer having an adhesive coating on the side of the web material facing the spool 112. The bottom laminate material is passed over a first idler roll 172 rotating in a counterclockwise direction and then over a second idler and guide roll 174, which rotates in a clockwise direction. The laminate leaves the second idler and guide roll 174 and passes around the bottom laminating roll 116. A brush 176 eliminates any residual static electrical charge on the bottom laminate and is positioned to contact the bottom laminate between the first and second idler rolls 172 and 174, respectively.

The vacuum roll 118 includes an extendable and retractable vacuum bar 178 for picking up a single sheet of pre-printed label material from the sheet holding and feed assembly 120 and rotating through a clockwise arc, as shown in FIG. 3, in a retracted configuration until the vacuum bar 178 is aligned on a radius between the axis of rotation of the vacuum roll 118 and the axis of rotation of the bottom laminating roll 116. Thereafter, the vacuum bar 178 extends outwardly to tack the underside of the leading marginal edge of the transported sheet to the predetermined desired location on the adhesive layer on the bottom laminate.

The vacuum bar 178 is caused to extend at precisely the right time to cause the leading edge of the following transported sheet ideally to abut the trailing edge of the immediately preceding sheet previously attached to the bottom laminate. By tacking the leading edge of the transported sheet to the precise desired location on the bottom laminate relative to the continuous transport of the bottom and top laminate material, the sheeter die will then cut the laminate sheet at precisely the location of the leading edge of the following pre-printed sheet, regardless of the location of the tracking edge of the preceding sheet. Each laminate sheet will then be cut at the proper location regardless of the particular location of the trailing edge of the pre-printed sheet from the preceding section. For example, if, for some reason, the preceding pre-printed sheet terminates sooner than expected relative to the top and bottom laminates, for example due to shrinkage, the sheeting die will nonetheless cut each sheet at the top of the transported sheet. Additionally, if for some reason such as stretching, the immediately preceding sheet is longer than the original 11 inch length or A4 length, the sheeting die will nonetheless cut the sheet at the leading edge of the following transported sheet even if there is a slight overlap of the leading edge of the following sheet and the trailing edge of the immediately preceding sheet. Any such overlap is tolerable since there will still be no cutting of any labels on the sheet itself. No label cutting occurs because there is always a small amount of tolerance provided at the leading and trailing edge of each sheet of labels. By this mechanism, the precise location of the trailing edge of the preceding sheet can be ignored, thereby providing greater flexibility in the operation of the machine.

A brush 180 is located underneath the vacuum roll to remove any static electrical charge which may have accumulated on the sheet as it was being removed from the sheet holding and feed assembly 120. The brush 180 also serves to keep the sheet being tacked to the bottom laminate at the bottom laminating roll 116 from touching and adhering to the bottom laminate in the vicinity of the first idler roll 172.

After the top and bottom laminate material and the pre-printed sheet are passed between the top and bottom laminating rolls 114 and 116, respectively, the resulting laminate web material is passed over a die base roll 182 rotating counterclockwise, as shown in FIG. 3, and underneath a label cutter die roll 184 in the web cutting label die assembly 130.

The laminate and the laminated web material are pulled through the machine from the laminate rolls 104 and 110 by upper and lower pull rollers 186 and 188, respectively. The pull rollers maintain a proper tension in the laminated web material through a clutch mechanism 190 on a shaft 192 transmitting torque to a lower pull roller drive chain 194 outside the alloy frame 56.

After the pull rollers, the laminated web material passes through the sheeter die base roll assembly 13 between a sheeter die roll 196 and a sheeter die base roll 198 where the laminated web material is cut into predetermined length sheets. Where each input sheet of pre-printed material, is, for example, 11 inches long, the sheeter die roll 196 has an 11 inch circumference to cut each segment of laminated web material at the anticipated start of succeeding sheet of laminated material, pre-printed labels in the preferred embodiment. Where the length of the pre-printed paper is of A4 size, the sheeter die roll has a corresponding circumference to cut the laminated web material at the desired location, namely the beginning of the succeeding laminated sheet. The leading edge of the sheet of laminated material just cut by the assembly from the following web material was previously placed on a conveyor belt 200 of the output sheet conveyor 136 to carry the output sheet to the output sheet tray 138. The conveyor belt 200 is driven by a belt drive chain 202 which in turn is driven by an AC conveyor motor 204. The conveyor motor 204 drives the conveyor drive chain 202 through a shaft passed through the alloy frame 56 to a sprocket for driving the chain 202 on the outside of the alloy frame. Each sheet is then transported lengthwise along the conveyor belt and passed into the output sheet tray 138 where the sheet is placed on a stack 206 of laminated sheets resting on an output platform 208 supported for vertical movement by a plurality of sleeves 210 riding on journal rods 212. The platform is raised and lowered by means of a pair of drive chains 214, one of which is shown on the outside of the frame 56 relative to the platform 208. The second platform' drive chain is on the opposite side of the output tray, and on the outside of the frame enclosing the output tray. The drive chain is driven through a chain 216 driven by an AC motor 218 mounted to the frame of the machine.

Just above the lowermost point of travel of the platform a platform motor stop switch 220 stops the platform motor 218, and therefore stops any further descent of the platform. A second switch 222 is located adjacent the platform stop switch 220 and stops the machine when the platform has become fully loaded with individual sheets of laminated labels.

The lower laminate roll 110 is monitored by a low laminate sensor 224 in the form of a plate 226 journaled on the shaft of the first idler roll 172 to activate a low laminate roll switch 228 when the amount of material left on the bottom laminate roll 110 reaches a given predetermined amount. An alarm or other indicator is activated when a lever arm 229 coupled to the plate 226 activates the switch 228.

Figure 4:
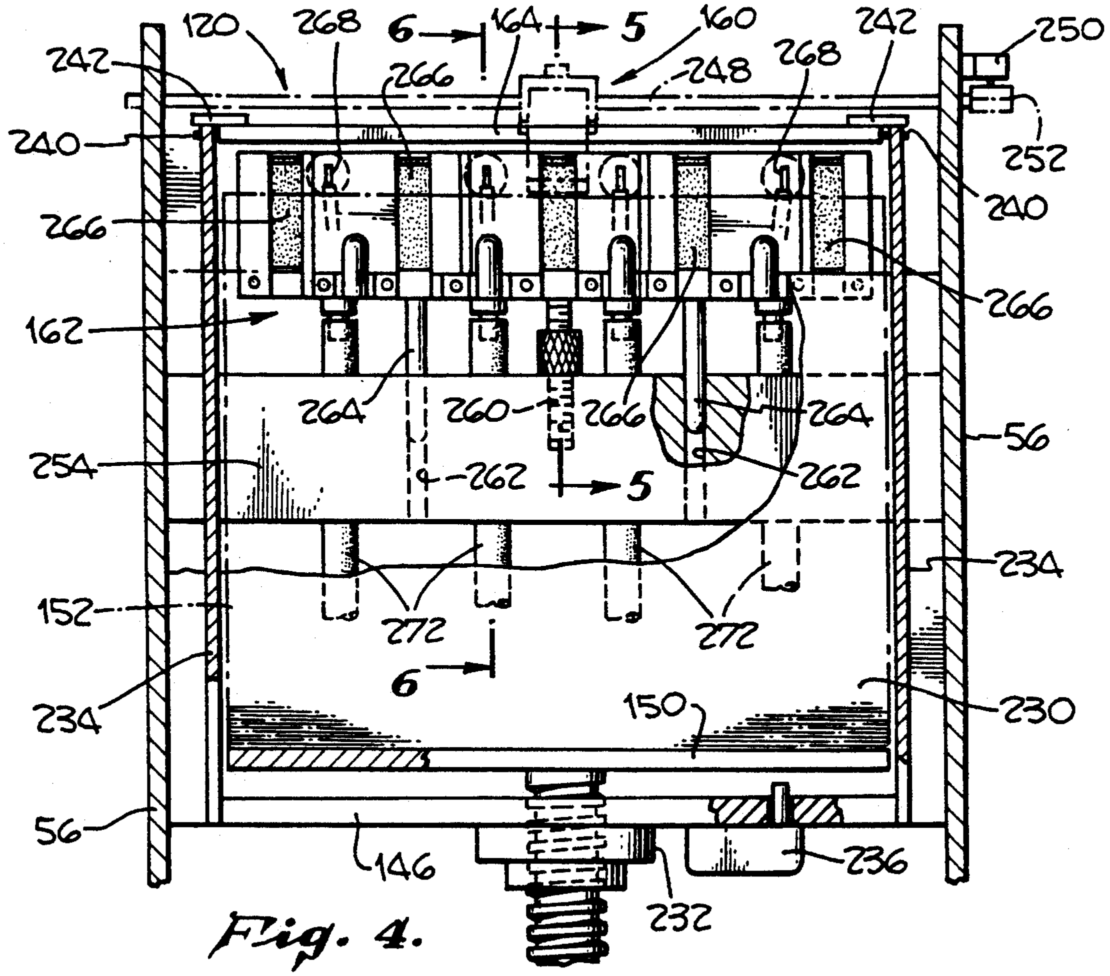
FIG. 4 is an oblique section of the front portion of the apparatus of FIG. 1 taken along the line 4—4 of FIG. 3 showing a partial cut-away view of the raw printed sheet holding bin and sheet separator assembly.

Considering the raw printed sheet holding bin and sheet separator assembly 120, in more detail, (FIGS. 4 and the assembly is supported between the two sides of the alloy frame 56 on a front plate 230 (FIG. 5) extending transversely across the forward side of the sheet holding and feed assembly 120. The plate 230 is shown in FIG. 4 partially cut away to reveal the sheet separator assembly 162. The front plate also supports the leading edge of the sheet stack 152. The sheet stack is shown in phantom in FIG. 4.

The base 146 of the sheet holding and feed assembly 120 includes a collar 232 through which the threaded screw element 148 passes. The sheet holding and feed assembly 120 is open at the back of the assembly (opposite the front plate 230) for ease of inserting a stack of pre-printed paper to be laminated, and includes sides 234. The sheet holding and feed assembly 120 is adjustable laterally by the knob 128 (FIG. 1). The sheet support plate 150 supports the sheet stack 152 within the side walls 234 and against the front plate 230. The height of the support plate 150 is adjusted by the jack screw 144 through control of the sheet level sensor assembly 160, described more fully below.

A plate stop switch 236 is mounted to the base 146 of the assembly and stops the jack screw when the sheet support plate 150 reaches the bottom of the assembly, such as when the platform is lowered by the operator to replenish the stack. The platform can then be raised again to raise the sheet stack to the desired position.

The floating paper hold down plate 164 holds down the sheets in the stack and floats a small distance upwardly to easy removal of the top sheet.

Figure 5:
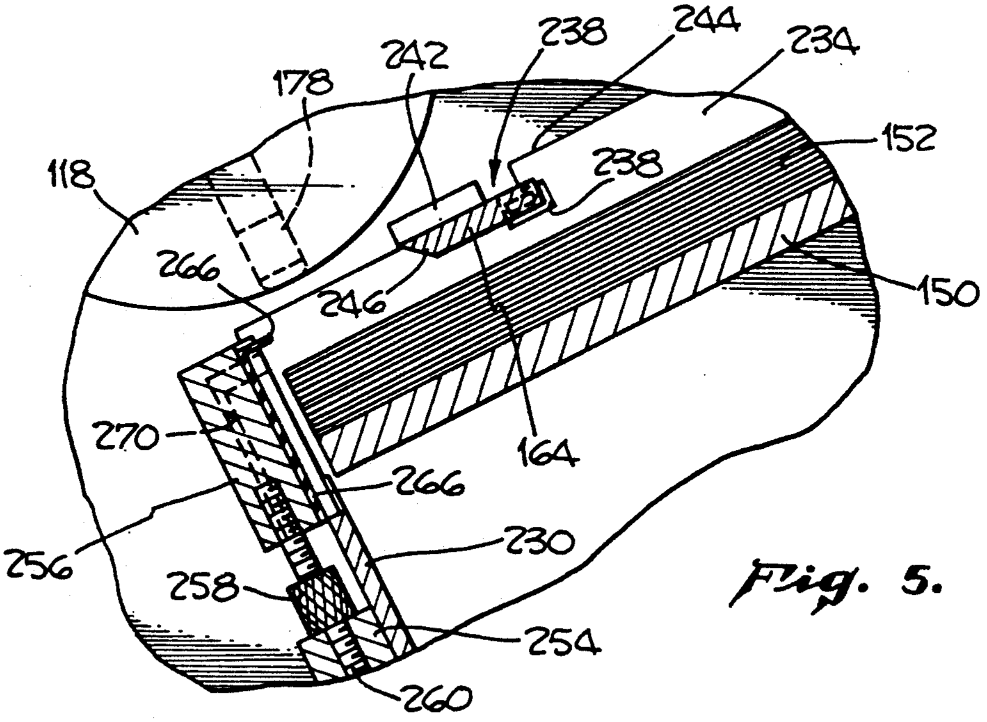
FIG. 5 is a detailed side section of the holding bin and sheet separator assembly taken along line 5—5 of FIG. 4.

Approximately one quarter of the way back along the top of the side walls 234, grooves 238 are milled in the top of each side wall to accommodate corresponding pins 240 (FIG. 4) extending outwardly from the respective sides of the floating paper hold down plate 164. Each pin extends beyond the respective side wall 234 from a point at the back of the hold down plate 164 (FIG. 5). Each pin is allowed to move up and down in the groove 238 an amount necessary to allow an individual sheet of paper to be removed from the stack. A pair of shoulders 242 on the top of the hold down plate extend outward over, and rest on, the top edges of the respective side walls 234 to keep the hold down plate from dropping further into the sheet holding assembly. A pair of bosses 244 extend over the respective groove 238 in the side walls at a position to allow the hold down plate to float upwardly while still retaining the hold down plate over the paper stack. The hold down plate includes a ramp surface 246 for allowing the top sheet in the stack to be moved smoothly.

The sheet level sensor assembly 160 (FIGS. 3 and 7) includes a rod 248 supported by the sides of the alloy frame 56 and extending transversely between the two sides of the frame. A paper level switch 250 is mounted on the outside of one frame wall above a paper top lever 252 fixed at one end to the rod 248 to activate the paper level switch 250 when the top of the paper stack reaches the sheet level assembly.

A bearing block 254 (FIGS. 4 and 5) is mounted to and extends across the outside of the front plate 230 at approximately the vertical center of the assembly 120. The bearing block 254 supports an air and rubber sheet separator bracket 256 adjustable relative to the top level of the sheet stack through a separator height adjustment nut 258 threaded on a height adjust bolt 260 mounted to the separator bracket 256 and passing into the bearing block 254. The bearing block also includes a pair of channels 262 for accepting and guiding corresponding alignment rods 264 mounted on the underside of the separator bracket 256. The alignment rods and the separator height adjustment allows the separator bracket to be adjusted higher or lower relative to the top of the sheet stack.

The sheet separator bracket 256 includes preferably five sheet separator fingers 266 made from rubber or some other tacky substance for separating any lower sheets from the top sheet being picked up by the vacuum bar 178 in the vacuum roll 118. Each finger is placed in the bracket and includes a flexible flange portion extending part way over the leading marginal edge of the paper, and parallel to the plane of the paper. The exposed end of the separator finger preferably extends outwardly passed the leading edge of the top paper sheet so that when the top paper sheet is picked up by the vacuum bar, the ends of the rubber fingers will contact the leading edge of the top sheet and separate the next succeeding sheet from the top sheet if both happen to be pulled up from the sheet stack by the vacuum bar. The separator fingers help to keep lower paper sheets underneath the top sheet in the bin as the top sheet is being removed by the vacuum roll.

The separator bracket 256 also includes preferably four air jet apertures 268 formed in the face of the bracket adjacent the sheet stack to inject air jets underneath the top paper sheet as it is being removed from the sheet stack in order to reliably and efficiently separate the top sheet from the stack and prevent the next sheets from being picked up with the top sheet. Air is supplied to the air jet apertures 268 through air channels 270 (FIGS. 5 and 6) formed in the sheet separator bracket. Air is supplied to the air channels by a plurality of air supply tubes 272 supplied by a standard compressor.

Considering the sheet level sensor assembly 160 in more detail (FIG. 7), the assembly includes an L-shaped paper level detector 274 wherein the foot of the detector rests on the top sheet of the paper stack. The detector 274 includes a cantilever portion 276 held in a detector bracket 278 for holding the detector 274 on the rod 248. As the paper stack rises in the sheet holding bin and contacts the detector 274, the detector and bracket 278 rotate causing the rod 248 to rotate, thereby lifting the paper top lever 252 to contact the paper level switch 250. Making the switch 250 turns off the jack screw motor, thereby keeping the paper stack at the level when the switch 250 was closed.

The operation of the sheet separator assembly 162 will now be briefly described in conjunction with FIGS. 6–8. After the vacuum roll has been rotated back to the position shown in FIG. 6, the vacuum bar 178 is ready to be extended outwardly to contact the top paper sheet. The vacuum bar is then extended radially outward and the vacuum turned on so that air is drawn into the vacuum bar. As the vacuum bar contacts the leading marginal edge of the paper sheet, preferably across the entire width of the sheet, the leading edge of the top sheet is sucked on to the vacuum bar. The vacuum bar is then retracted into the vacuum roll, thereby pulling the leading edge of the top sheet past the extended fingers 266 to separate any subsequent sheet that may be following the top sheet. After the top sheet passes the tips of the rubber fingers, air is blown from the air jet apertures 268 underneath the top sheet and across the top of the next succeeding sheet to assist in separating the top sheet from the rest of the stack. The top sheet is blown up against the floating paper hold down plate 164 to allow the top sheet to be pulled from the stack. While the air jet continues to blow air under the top sheet, the vacuum roll rotates with the leading edge of the top sheet still sucked onto the end of the vacuum bar to tack the leading edge onto the adhesive layer on the bottom laminate web at the lower laminating roll. As the paper sheets are depleted from the stack, the paper level detector 274 lowers down, causing the rod 248 to rotate clockwise.

As the paper is depleted, the paper top lever 252 also rotates and eventually allows the switch 250 to open. Opening the switch 250 activates the jack screw motor to raise the paper stack until the switch 250 is again closed.

The general methodology of the machine in picking up individual sheets of pre-printed paper, or other material, and inserting the sheet into the laminating process will now be described with respect to the schematic drawings of FIGS. 10-15. These figures are not in detail and do not show the operation which results in movement of the vacuum roll, but shows how an individual sheet is incorporated into the laminating process from the holding bin. During the significant portion of a cycle, the vacuum roll is in a rest mode or position as shown in FIG. 10. The vacuum roll 118 is stationary and the vacuum bar 178 is retracted. The vacuum roll is positioned such that the vacuum bar is immediately above the leading marginal edge of the top sheet in the sheet stack 152. The sheet separator assembly will have been raised or lowered for optimum performance and the sheet stack has been raised up to the necessary level underneath the paper level detector 274 by the jack screw 144. Through rotation of various gears and cams described more fully below, the vacuum bar 178 extends radially outward of the circumferential surface of the vacuum roll 118 (FIG. 11), the vacuum is turned on sucking the front portion of the top sheet against the exposed relatively flat face of the vacuum bar 178, so that the top sheet stays with the vacuum bar as the vacuum bar retracts back into the vacuum roll (FIG. 11). The vacuum bar 178 is retracted through further rotation of the gears and cams. After the vacuum bar has retracted, the vacuum roll is rotated, clockwise as shown in FIG. 13, pulling the top sheet with it away from the sheet holding bin and feed assembly.

The vacuum bar 178 is allowed to extend outwardly of the vacuum roll at its newly rotated position (FIG. 13) until the underside of the leading marginal edge portion of the top sheet contacts the adhesive layer on the bottom laminate. Where the pre-printed sheet material is 8½ by 11 inches, the extension of the vacuum bar and rotation of the other rolls on the machine are synchronized so that the leading edge of the sheet is always tacked onto the lower laminate at 11 inch increments. Where the paper is of a different length, the leading edge of the sheet is always tacked onto the adhesive layer of the lower laminate at an increment longitudinally along the lower laminate equal to the length of the sheet. In this way, the sheet is always placed in a known location on the lower laminate and any effects due to shrinkage or stretching of the upper or lower laminate can be disregarded. The laminated material will always be cut at increments equal to the length of the paper, e.g. every 11 inches, and any gap or overlap between adjacent sheets is unimportant.

As soon as the leading edge of the sheet is tacked to the lower laminate, the vacuum is removed from the vacuum bar and the vacuum bar is retracted back into the vacuum roll (FIG. 14). The vacuum roll is then rotated in the counterclockwise direction, as viewed in FIG. 16, to its original holding position. The cycle then repeats itself for each individual sheet of pre-printed material.

Considering the laminating and die cutting hardware in more detail (FIG. 27), it should be understood that the rolls, die cutter rolls and secondary rolls and rollers are mounted in between, and supported on opposite sides by, the alloy frame members 56 (FIGS. 1-4) through appropriate shafts and bearing assemblies as would be known to one skilled in the art. Unless otherwise specified, the drive and transmission gears and chains are located outside the alloy frames 56 but still within the panel covers 54.

The rolls are driven by a main ¾-horsepower drive motor 280 powered through a main drive control transformer taking 115 volts AC and converting it to 0 to 90 volts DC. The motor 280 drives a motor output gear 282 through an adjustable clutch mechanism (not shown) to drive a main drive chain 284. The main drive chain drives a conversion gear 286 which matches the timing of base rolls, which have a larger diameter than the other rolls, with the rotation of the other rolls, which have a circumference preferably equal to the length of the label sheets. The conversion gear 286 is coupled through a shaft to a main drive gear 288 which in turn is directly coupled through a shaft to the die base roll 182. The main drive gear transfers the torque from the main motor to all the other rotating components from the vacuum roll all the way to the sheeter die base roll. The linkages from the main drive gear 288 will now be discussed.

Figure 24:
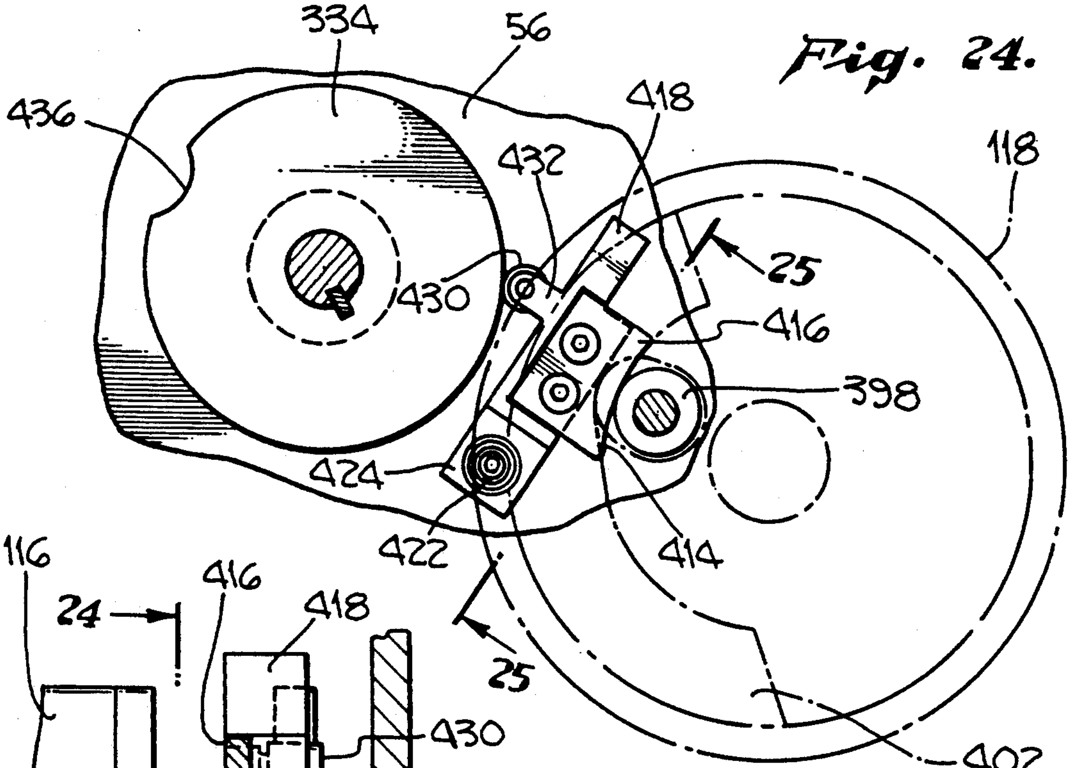
FIG. 24 is a side elevation view of a pivot arm and cam plate assembly for allowing extension and retraction of the vacuum bar to tack a label sheet on a lower laminate material through action of a cam wheel.

Because the components downstream from the die base roll are less complex than those upstream, the downstream components will be discussed first. Specifically, the main drive gear 288 drives a first transfer gear 290 which in turn drives an upper pull roller drive gear 292 directly through a shaft for the upper pull roller 186. The upper pull roller drive gear 292 also drives a pull roller clutch drive gear 294 (FIGS. 23 and 24). The clutch drive gear 294 drives a first clutch gear 296 through a drive chain 298 (FIG. 28). The clutch gear 296 drives a lower pull roller drive gear 300 through a Magpower Model MM21D36 clutch 302, which operates between 0 and 90 volts DC. The clutch transmits the torque from the first clutch gear 296 to the drive gear 300, which in turn transmits the torque to the lower pull roller gear 304 mounted on the end of the shaft which drives the lower pull roller.

Returning to the upper pull roller drive gear 292 (FIG. 27), the drive gear 292 also drives a sheeter die base roll gear 306 mounted on the shaft of the sheeter die base roll 198. The base roll gear 306 in turn drives a sheeter die gear 308 to turn the sheeter die roll 196 through the common shaft.

Returning to the main drive gear 288, the main drive gear 288 also transfers the main motor torque to a label cutter die gear 310 which turns the label cutter die roll 184 through the common shaft.

The main drive gear 288 also drives an assist roll drive gear 312 for turning an assist roll transmission gear 314 through a common shaft. The assist roll transmission gear 314 drives an assist roll drive chain 316 for turning an assist roll conversion gear 318. The conversion gear 318 drives the assist roll 168 at a relatively faster speed through a manually adjustable drive clutch 320. The clutch 320 can be adjusted so that the assist roll can be driven at any speed faster than the other rolls are driven to help pull the top laminate off of the top laminate roll 104 against the tension or drag produced by the brake on the top laminate roll (discussed more fully below).

The main drive gear 288 also drives a second transfer gear 322 which in turn drives a lower laminating roll gear 324 which turns the lower laminating roll 116 through their common shaft. The lower laminating gear in turn drives an upper laminating gear 326 which turns the upper laminating roll 114 through their common shaft.

The second transfer gear 322 also drives a transmission driver gear 328, which in turn drives a first transmission gear 330 on a common shaft and a first vacuum roll cam 332 (FIG. 23) on the same shaft. The first vacuum roll cam 332 and the motion of the vacuum roll will be described more fully below with respect to FIG. 23. The first transmission gear 330 also drives a second transmission gear 334 which in turn drives a third transmission gear 336. The function and operation of these second and third transmission gears will be described more fully below with respect to FIGS. 22 and 23.

The upper laminate roll 104 is supported and turns on a shaft, the speed of rotation of which is controlled by a brake assembly 338 in the form of a Magpower 5 pound unwind brake. The brake 338 places a drag on the rotation of the upper laminate roll shaft which is automatically adjustable according to the amount of laminate left on the roll. As the laminate is dispensed, the weight of the roll decreases, thereby requiring an increased braking force on the shaft to maintain the proper tension in the upper laminate, between the upper laminate roll and the upper laminating roll 114.

The lower laminate roll 110 rotates on and is supported by a shaft, the speed of rotation of which is controlled by a lower laminate brake assembly 340, which may be a Magpower 25 pound unwind brake, where the bottom laminate is adhesive labels, but may be a 5 pound brake where the bottom laminate is a clear laminate. The lower laminate brake assembly 340 serves the same function as described above with respect to the top laminate brake assembly 338. The lower laminate brake assembly 340 is automatically controlled by a bottom unwind tension control potentiometer, which is varied as a function of the diameter of the laminate roll or the play out of the bottom laminate.

The detailed characteristics of the gears, drive mechanisms and rolls are generally well known to those skilled in the art of laminating machines. However, the characteristics of certain components of the present invention are notable. The guide roll 170 includes a roll surface which comes into contact with the adhesive layer on the upper laminate. In order to keep the top laminate from binding or adhering to any part of the surface of the guide roll 170, the contact surface of the guide roll is wrapped with a uneven, non-tacky rubber or other material similar to the Tesaband 4863 brand tape. The upper idler roll 174 is also wrapped with the same or similar material to prevent binding or adhesion between the idler roller and the adhesive layer on the bottom laminate.

The die cutting base rolls 182 and 198 have a diameter slightly larger than the opposing die cutting rolls 184 and 196, respectively, in order to provide an adequate base for cutting the laminate. The label cutting die roll 184 is of any well known design and includes cutting edges according to the desired label configuration defined by the pre-printed label sheet being laminated. The circumference of the label cutting die roll is equal to the length of the pre-printed label sheet. The label cutting die roll 184 preferably includes a registration mark at one point on the circumference of the roll corresponding to a predetermined location on the label cutting die roll, such as the position of the label cutting die roll when the leading marginal edge of a new sheet reaches the contact point between the label cutting die roll 184 and the label cutting die base roll 182. The registration mark preferably would then be in a visible location on the label cutting die roll to be in registration with a suitable mark on the alloy frame or other stationary location on the machine. Using the registration mark, the machine can be "jogged" or incremented until the registration mark aligns with the corresponding stationary mark so that the label cutting die roll and, if necessary, the sheeter die roll 196, can be replaced with substitute die rolls having corresponding registration marks so that the die rolls can be correctly installed in registration.

The sheeter die roll includes a cutting edge for cutting through the entire laminate fed between the sheeter die roll and the base roll 198 by the pulling rolls 186 and 188. The sheeter die roll produces individual sheets of laminated labels or other pre-printed sheet material.

Considering the rotation of the vacuum roll (FIG. 23), the vacuum roll 118 rotates through an approximately 65° arc back and forth through operation of the first vacuum roll geneva cam driver 332 and a second vacuum roll geneva cam driver 342 contra rotating with respect to each other. (It should be noted that rotation of the vacuum roll in the drawings (e.g. FIGS. 10–16) is exaggerated for clarity. Also, the spacing shown in FIGS. 22 and 23 between adjacent gears, the vacuum roll and the other hardware is also exaggerated for clarity.) The second geneva cam driver 342 is driven by the second transmission gear 334 through a common shaft. The first geneva cam driver 332 includes a cam follower 344 positioned to engage a slot on a two slot vacuum roll geneva 346. The cam follower 344 is mounted near the outside rim of the cam driver 332 so that when the vacuum roll geneva 346 is in the approximate position shown in FIG. 23, the cam follower is just withdrawing from the slot after rotating the geneva through an angle of approximately 65° to rotate the vacuum roll 118 in a counterclockwise direction, as viewed in FIGS. 3 and 22, so that the vacuum bar is returned to its rest position above the sheet stack. The two slot geneva 346 then is stationary as the cam follower 344 comes out of the geneva until such time as the second geneva cam drive 342, having a corresponding cam follower 348 rotates in a clockwise direction until the cam follower 348 engages the corresponding other slot in the vacuum roll geneva 346. Upon continued rotation of the second geneva cam driver 342, the vacuum roll 118 is rotated back in a clockwise direction so that the leading edge of the sheet picked up by the vacuum bar can be tacked onto the lower laminate.

Back and forth rotation of the vacuum roll geneva 346 is transmitted through a shaft to a vacuum roll drive gear 350 which in turn moves a vacuum roll gear 352 back and forth. A vacuum line 354 is coupled to a connector 356 on the vacuum roll gear 352 for applying a vacuum to the vacuum bar inside the vacuum roll 118. The vacuum roll 118 is fixed to and supported by a shaft 358. At the opposite end of the shaft 358 from the vacuum roll gear 352, a vacuum pickup locking cam 360, having two pairs of cam slots, holds the vacuum roll in one of the two positions 65° apart, either the resting position with the vacuum bar over the sheet or in the tacking position with the vacuum bar aligned with the point on the lower laminate where the sheet is to be tacked. A cam follower assembly 362 includes a pair of diametrically oppositely disposed cam followers 364 to hold the cam, and therefore the vacuum roll, in a stationary position until such time as one of the cam followers 344 or 348 on the geneva cam drivers moves the vacuum roll to its other position. The cam slots in which the cam followers are shown in FIG. 23 correspond to the vacuum roll being in the rest or holding position with the vacuum bar over the sheet stack. The other two cam slots correspond to the vacuum roll being in the tacking position.

Considering now the operation of the vacuum bar in picking up the top sheet from the sheet holding bin and feed assembly in conjunction with FIG. 22, the third transmission gear 336 drives a vacuum bar geneva cam driver 364 through a common shaft. The vacuum bar geneva cam driver 364 includes a pair of cam followers 366 mounted on the cam driver at approximately the outer rim of the cam driver and oriented approximately 90° apart with respect to each other. The cam followers drive a four-slotted vacuum bar geneva 368 which turns a vacuum bar drive gear 370 mounted on a shaft common to the four-slotted vacuum bar geneva. The drive gear 370 turns a first vacuum bar transfer gear 372 which in turn drives a vacuum bar extension drive chain 374. The chain 374 drives a vacuum bar cam gear 376 which turns a first vacuum bar cam 378 through a common shaft. The vacuum bar extension drive chain 374 also drives a second vacuum bar transfer gear 380 which in turn drives a second vacuum bar transfer gear 382 through a common shaft extending from the left side of the machine to the right side of the machine. The gear 382 drives a second vacuum bar extension drive chain 384, to drive a second vacuum bar cam gear 386. The second cam gear 386 turns a second vacuum bar cam 388 to allow extension of the vacuum bar down to the top sheet of the sheet stack 152 supported by the platform 150.

The first vacuum bar cam 378 operates a first balanced cam follower 389 so that when the eccentric surface of the cam 378 bears against the cam follower 388, the cam follower raises up. The second vacuum bar cam 388 operates against a corresponding second balanced cam follower 390 in the same manner. The first balanced cam follower 389 includes a first cam surface 392 for bearing against and moving a first vacuum bar cam follower 394 linked through a rod to the vacuum bar in the vacuum roll 118. In like manner, the second balanced cam follower 390 includes a cam surface 396 which bears against and operates on a second vacuum bar cam follower 398 coupled through a rod to the vacuum bar.

When the vacuum roll 118 rotates between the rest position and the tacking position, the first vacuum bar cam follower 394 follows a rotation cam 400, the arcuate portion of the rotation cam followed by the cam follower 394 keeping the vacuum bar 178 retracted. In like manner, the second vacuum bar cam follower 398 follows the cam surface on a second rotation cam 402 during rotation of the vacuum roll. The vacuum bar is maintained in its retracted position during most of the arcuate portion of the cam surface.

The rods which support the vacuum bar cam followers 394 and 398 are coupled to the vacuum bar through a vacuum bar mounting plate 404 such that the vacuum bar 178 and the mounting plate 404 are biased outwardly by two pairs of springs through respective brackets 406 and 408 fixed to the cam roll. The springs bias the vacuum bar outwardly the various rotation cam surfaces 400 and 402. A vacuum line 410 couples the vacuum line 354 (FIG. 23) to a vacuum line bracket 412 mounted on the vacuum bar mounting plate 404 for providing a vacuum to the vacuum bar 178.

Considering the specific operation of the third transmission gear and the extension and retraction of the vacuum bar at the leading edge of the sheet, the transmission gear 336 continuously drives the vacuum bar geneva cam driver 364. As indicated, the cam driver has only two cam followers 366 to operate the four-slot geneva 368. In the configuration shown in FIG. 22, the leading cam follower 366 has just moved the geneva 368 a quarter turn and is about to leave the corresponding geneva slot. The trailing cam follower is about to enter the next succeeding slot on the geneva 368 to continue turning the geneva. The leading cam follower had turned the geneva and thereby turned the cams 378 and 388, through the previously described gears and linkages so that the balanced cam followers 389 and 390 fall away. As a result, the first and second vacuum bar cam followers 394 and 396 fall into the spaces of the first and second rotation cams, allowing the vacuum bar to extend outwardly of the vacuum roll in response to the spring bias on the brackets 406 and 408. As the vacuum bar geneva cam driver 364 continues to rotate, the trailing cam follower will enter the next geneva slot to continue turning the geneva. For the first quarter turn of the geneva through the leading cam follower, the cams 378 and 388 make a half rotation. During the next quarter turn of the geneva through the action of the trailing cam follower, the cams 378 and 388 make another half turn, raising the first and second cam followers 388 and 390 to thereby lift the first and second vacuum bar cam followers 394 and 398 to retract the vacuum bar 178, taking along with it the top sheet from the sheet stack 152. The geneva then will have made an additional quarter turn from its position shown in FIG. 22. The trailing cam follower 366 then leaves the corresponding geneva slot and the cam driver 364 continues to rotate. Because there are no other cam followers on the cam driver 364, the geneva and downstream gears and cams remain stationary, up to the balanced cam followers 389 and 390, until such time as the leading cam follower on the vacuum bar geneva cam driver 364 engages the third geneva cam slot on the next cycle.

Figure 25:
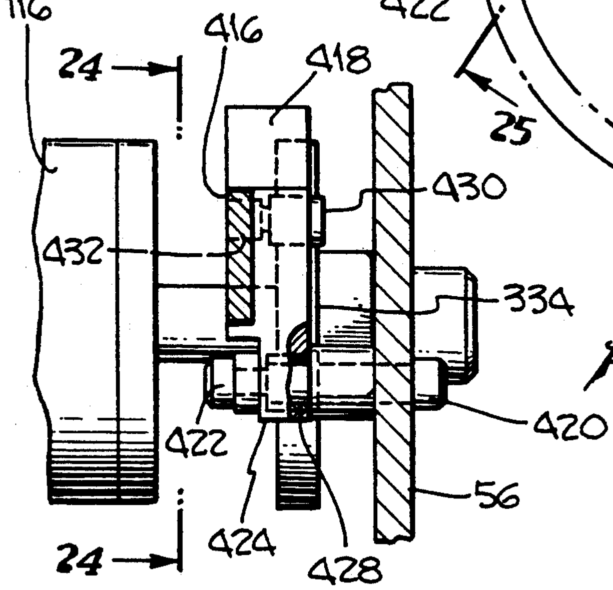
FIG. 25 is an elevation and partial sectional view of the pivot arm and cam plate assembly of FIG. 24 taken along line 25—25.
Figure 26:
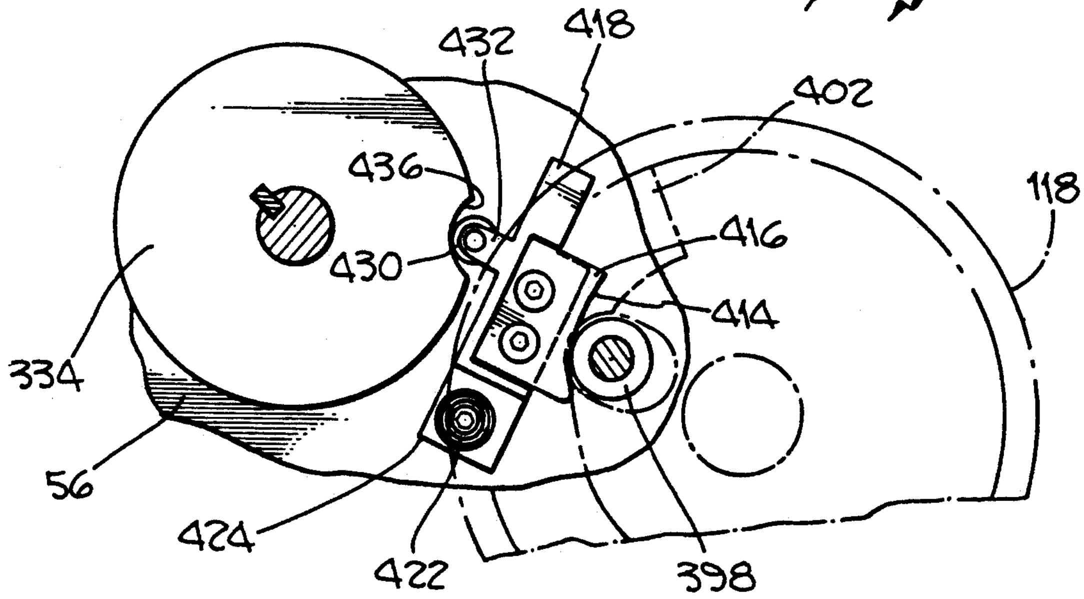
FIG. 26 is a side elevational view similar to that of FIG. 24 showing the cam wheel and pivot arm/cam plate assembly in a position to allow extension of the vacuum bar.

Once the vacuum roll 118 has rotated the approximately 65° to the sheet tacking position, the vacuum bar is then in a position to be extended to accomplish tacking of the leading marginal edge of the sheet to the appropriate location along the lower laminate. Specifically, the vacuum bar cam followers 394 and 398 have followed along the surface corresponding to first and second rotation cams 400 and 402. As the vacuum roll approaches the end of its rotational travel, each vacuum bar cam follower rides up onto an arced surface 414 on a cam plate 416 (FIGS. 24–26). The cam plate 416 is mounted in a recess milled into a right pivot arm 418 pivotally mounted to the right frame wall 56, through a pivot arm mounting bolt 420. The pivot arm mounting bolt passes through the right frame wall 56 and is held in place by a nut 422 resting in a recess 424 formed in the side of the right pivot arm. The right pivot arm is raised from the side of the right frame wall 56 by a spacer 426. The pivot arm rotates on a preferably brass bearing 428 mounted in a recess in the bottom side of the pivot arm, opposite the recess 424. The arced surface 414 of the cam plate 416 holds the second vacuum bar cam follower 398 (FIG. 24) stationary, and back against an arcuate surface in the side wall of the vacuum roll 118, through a follower roller 430 rotatably mounted on a lug 432 on the pivot arm facing in a direction opposite the arced surface 414. The pivot arm 418 is held stationary against the bias of the cam roll springs (on brackets 406 and 408 (FIG. 22)) by a cam wheel 334 mounted on the end of the lower laminating roll 116. The cam wheel 334 includes a single recess 436 in the circumferential surface thereof which rotates with the lower laminating roll until the follower roller 430 enters the recess, thereby allowing the vacuum bar to extend from the vacuum roll and tack the marginal portion of the top sheet to the precise location on the lower laminate at the predetermined 11 inch spacing (for 8½×11 sheets). The vacuum bar extends outwardly through a combination of the bias of the springs and the pivoting of pivot arm 418. As the cam wheel continues to rotate, the follower roller 430 rides back up on the outer circumferential surface of the cam wheel, thereby pushing the second vacuum bar cam follower 398 back to its original rest position with the vacuum bar retracted.

The apparatus includes a second matching pivot arm and cam plate assembly on the left alloy frame wall on the opposite side of the vacuum roll. The matching assembly is a mirror image of that shown in FIG. 24 and has the identical structure and function. The matching assembly operates with a further cam wheel (FIG. 27) on the lower laminating roll 116. Together, the pivot arm and cam plate assemblies operate with the corresponding cam wheels to allow precise and even extension of the vacuum bar to tack the marginal edge of the top sheet onto the lower laminate.

Figure 17:
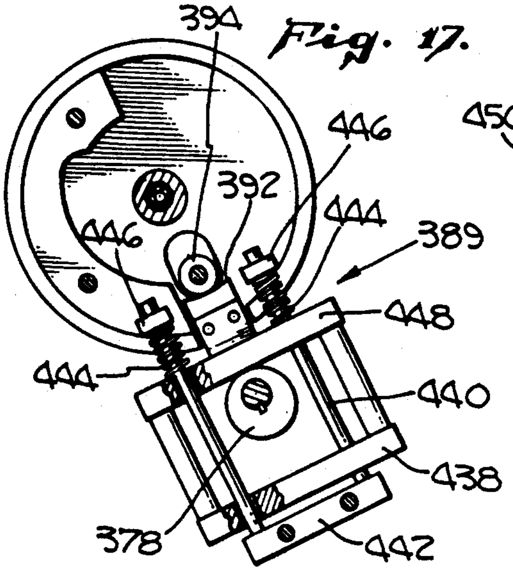
FIG. 17 is a side elevation view and partial cut-away showing a cam mechanism for operating the vacuum bar over the holding bin.
Figure 18:
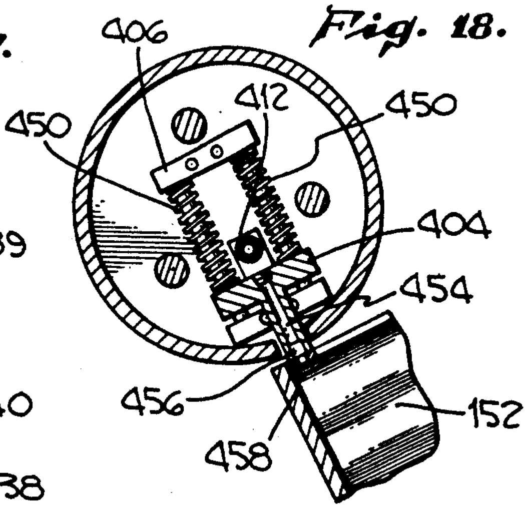
FIG. 18 is a side section of the vacuum roll, vacuum bar and part of the holding bin showing extension of the vacuum bar.
Figure 19:
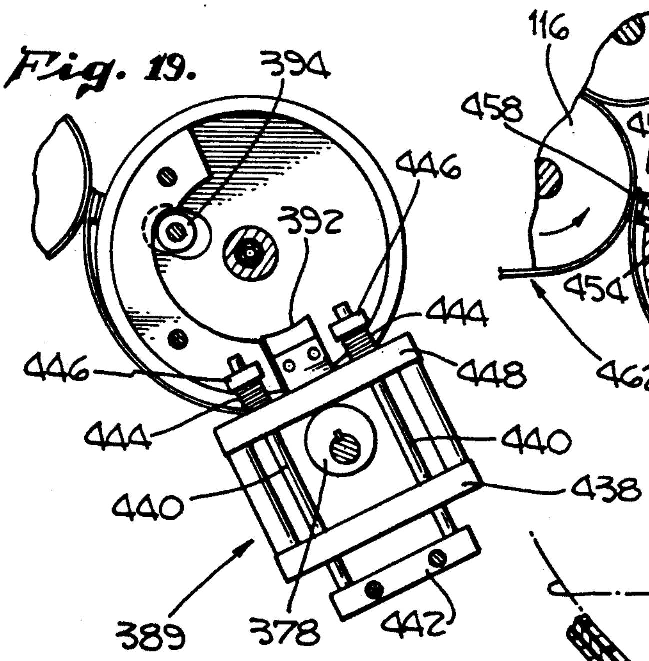
FIG. 19 is a side elevation view of the vacuum roll and cam assembly similar to that of FIG. 17 showing the vacuum bar actuated to tack the pre-printed sheet to one laminating sheet.

Considering the first balanced cam follower assembly 389 in more detail (FIG. 17), the assembly 389 includes a frame 438 supporting a pair of spaced apart rods 440 passing through top and bottom plates in the frame. One end of each rod is coupled to the corresponding end of the other rod through a bridge 442. The frame is biased toward the bridge by a pair of springs 444, one on each rod, on the side of the frame opposite the bridge. The springs are retained by respective washers 446. The frame includes a cam follower plate 448 which bears against the first vacuum bar cam 378 through the bias of the springs 444. Rotation of the cam 378 so that the eccentric surface bears against the cam follower plate 448 moves the frame of the first balanced cam follower 388 against the bias of the springs so that the first cam surface 392 pushes the first vacuum bar cam follower 394 upward to retract the vacuum bar. Upon continued rotation of the cam 378, the cam follower plate 448 moves down (outward relative to the vacuum roll) so that the vacuum bar extends from the vacuum roll. The vacuum bar extends outwardly of the vacuum roll through the bias of springs 450 (FIG. 18) in the bracket 406 to push the vacuum bar mounting plate 404 radially outward (FIG. 18).

The vacuum line 410 (FIG. 22) is coupled to the vacuum connector 412 for coupling the vacuum with the vacuum line 410 to a channel 454 between the vacuum connector and a plenum 456 in the vacuum bar. The plenum couples the vacuum to a plurality of vacuum ports in a vacuum bar end plate 458, preferably made from rubber or some other suitable tacky material (FIG. 9). The vacuum bar end plate 458 preferably has five evenly spaced holes opening into the plenum for placing a vacuum against the forward marginal edge portion of the top sheet in the bin.

Figure 20:
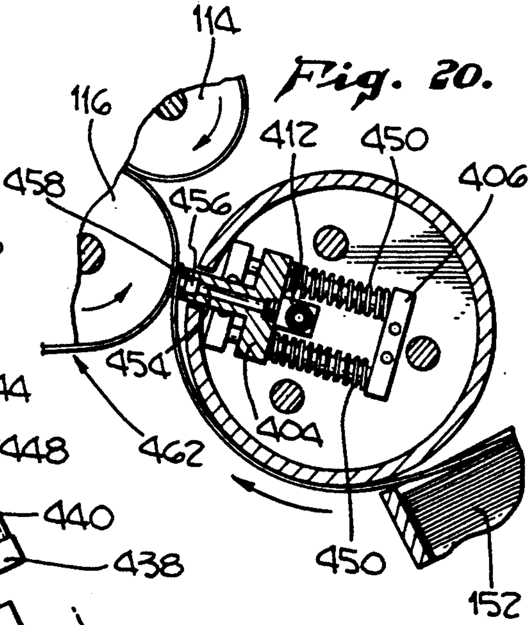
FIG. 20 shows a side section of the vacuum roll and vacuum bar extended to tack the leading marginal edge of a sheet on a laminating stock.
Figure 21:
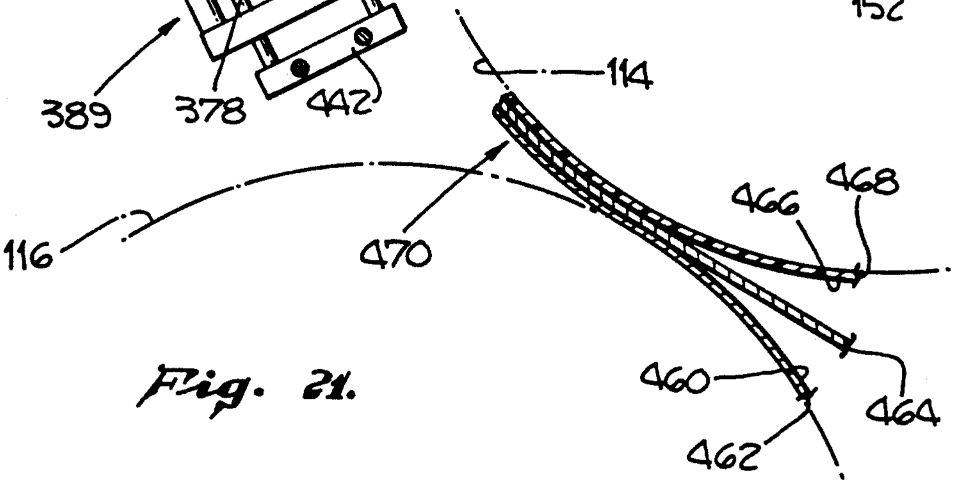
FIG. 21 is a schematic representation of the process of laminating a pre-printed sheet, for example between a clear plastic cover sheet and a pressure sensitive adhesive backing sheet.

After the leading marginal edge portion of the top sheet is tacked onto the precise predetermined location on the lower laminate, the vacuum is removed and the vacuum bar is retracted. As the lower laminating roll 116 and the upper laminating roll 114 (FIG. 20) continue to rotate, the leading marginal edge of the top sheet is pulled along by the adhesive layer 460 on the lower laminate 462, and pulled into the pressure zone between the upper and lower laminating rollers. The top pre-printed sheet 464 (FIG. 21) is pulled into the pressure line between the two rollers and laminated between the adhesive layer on the lower laminate sheet 462 and the adhesive layer 466 on the upper laminate sheet 468. After passing between the pressure line between the laminating rollers, the laminated web material 470 is pulled away from the upper and lower laminating rollers and over the label cutting die base roll 182 by the pull rollers 184 and 188 (FIG. 3).

After the laminate is formed, the laminate passes to the label cutting die assembly 130. The label cutting die 186 and the base roll 182 are mounted on respective bearings (not shown) between the right and left alloy frame walls 56 (right and left are reversed in FIG. 29 since the assembly is viewed from the back of the machine). The label cutter die base roll 182 is mounted in the allow frames through appropriate bearing mounts. The label die cutter roll 186 is placed in a pair of slots in the frame walls and is held in place by a die cutter roll hold-down bracket 472. The die cutter roll includes die cutting surfaces 474 in a selected arrangement on the circumference of the roll to cut labels from the laminate in the desired configuration. FIG. 30 shows labels cut in a uniform rectangular configuration, but labels can also be cut in non-uniform shapes.

The label cutter die gear 310 is mounted on the shaft of the die cutter roll and held in place by a gear bracket 476.

The hold-down bracket 472 includes a pair of mounting plates 478 mounted to the frame walls and extending inwardly toward each other over the space between the alloy frame walls. The hold-down bracket includes a cross bar 480 extending between the undersides of the mounting plates 478 and held in place by corresponding die cutting roll adjust bolts 482 passing through respective ends of the cross bar. The adjust bolts pass through the mounting plates 478 and are threaded through a fixed plate 484 down to an anvil 486 on the top surface of a hold-down block 488. A pair of guide rods 490 extend upwardly from the top surface of the hold-down block on opposite sides of the adjust bolt 482 to stabilize the threading of the adjust bolts and the force applied to the hold-down block 488.

The hold-down block 488 is movable over a pair of guide pins 492 mounted on mounting blocks 494 rigidly mounted to the alloy frame walls 56. The pins 492 guide the hold-down block as the hold-down block is moved upward or downward through turning of the adjust bolts 482. The hold-down block includes a pair of hold-down rollers 496 mounted in a recess in the interior of the guide block so that the rollers contact an end circumferential surface 498 on the label cutting die roller 186. The hold-down block and rollers 496 stabilize and hold down the die cutting roller as it rotates and cuts the labels in the laminate. The adjust bolts 482 adjust the pressure applied by the die cutting roll and therefore the depth of cut made by the cutting edges 474. It should be understood that a corresponding hold-down block assembly is also on the opposite side of the die cutting roller.

A similar assembly is provided for the sheeter die base roll 198 (FIG. 3) to hold down and stabilize the sheeter die base roll. It should be understood that the structure and function of the hold-down assembly is similar to that described above with respect to the hold-down assembly 472 of FIG. 29.

Significantly, the label cutting die roll 186 and the sheeter die roll are preferably designed to provide a leading margin 500 and a trailing margin 502 for each sheet of laminate so that the series of labels begins after the leading margin and terminates before the trailing margin. Preferably, each sheet is cut so that the length of the trailing margin of one sheet is approximately the same as the length of the leading margin of the next succeeding sheet of laminate. Additionally, each length of laminate material is preferably cut precisely at the leading edge of each separate sheet of pre-printed label material so that the sheeter die roll cuts each sheet at precisely the same location at the leading marginal edge. As a result, the precise location of the trailing margin of the immediately preceding pre-printed label sheet becomes irrelevant. The marginal edge of each sheet will be consistently cut at the leading marginal edge of the pre-printed label sheet, regardless of whether the immediately preceding pre-printed label sheet has stretched to overlap slightly the leading marginal edge of the following sheet or has shrunk to leave a gap between the label sheets with only upper and lower laminate therebetween. In either case, the sheeter die roll will cut the laminate web material precisely at the leading marginal edge of each label sheet.

The label cutter die roll is preferably designed and adjusted so as to cut through the upper laminate and the label sheet layers so that the labels can be easily removed from the lower laminate or backing layer. (See FIG. 31.)

Figure 32:
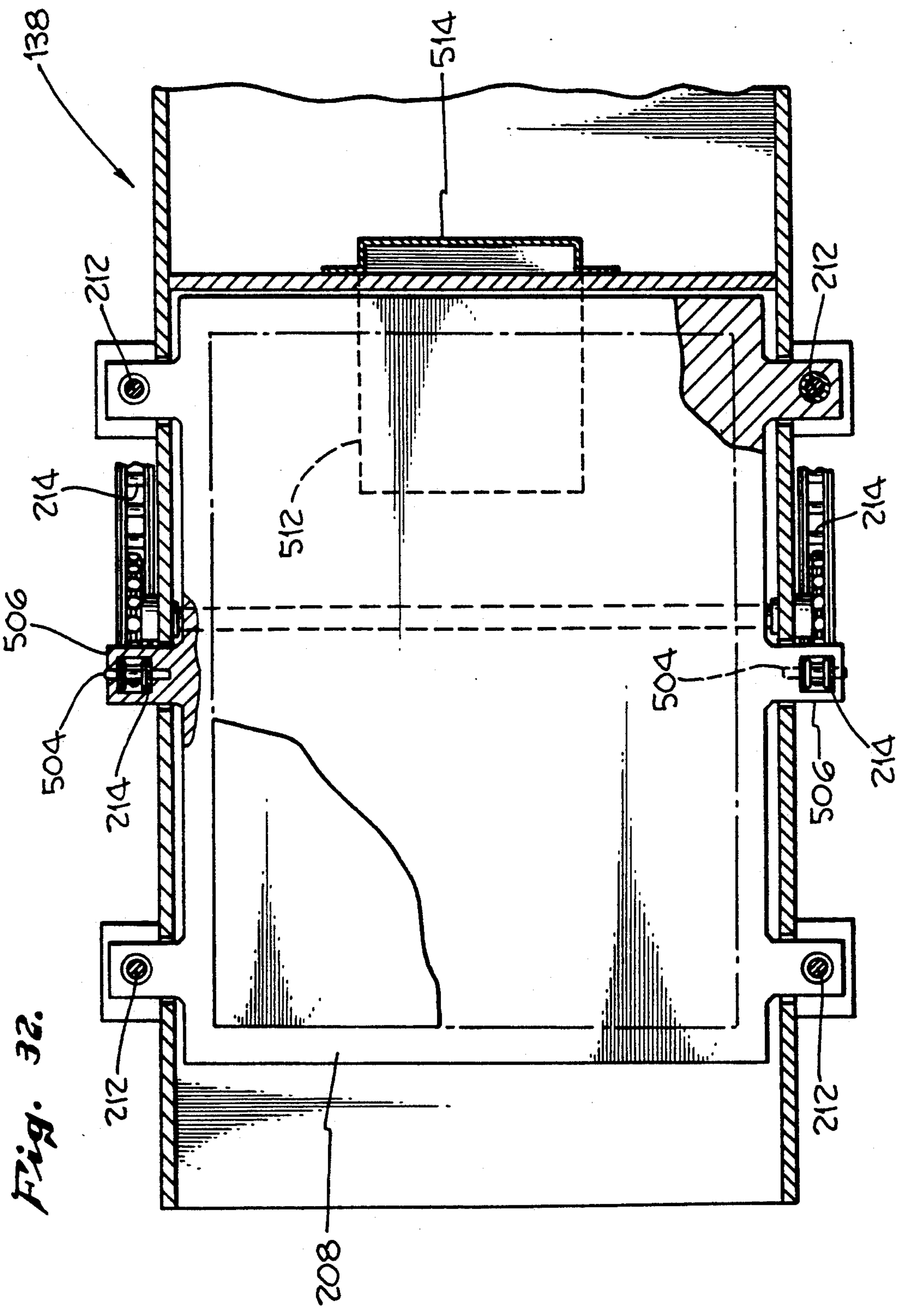
FIG. 32 is a top plan view of an output tray for holding individual laminated sheets.

Considering the output sheet tray 138 in more detail (with respect to FIGS. 3 and 32), the platform drive chain 214 is linked to the output platform 208 through respective pins 504 supported by left and right intermediate lugs 506 on the platform. Four corner lugs 508 support the sleeves 210 (FIG. 3) gutted by the journal rods 212.

The upstream side of the output tray is defined by a wall 510 separating the output tray from the motors 204 and 218. A blower 512 (FIGS. 3 and 32) provides air to a plenum 514 on the side of the wall opposite the output tray. The plenum extends the entire height of the wall and includes a flange 516 at the top of the plenum to direct air from the blower over the output sheet stack 206. The flange is preferably placed immediately below the conveyor belt 200 so that a layer of air blows underneath the laminated sheet being output to the output platform. The layer of air allows each sheet to float over the stack until the entire sheet has been fed from the conveyor and under a guide bar 518 over the end of the conveyor belt (FIG. 3).

Figure 33:
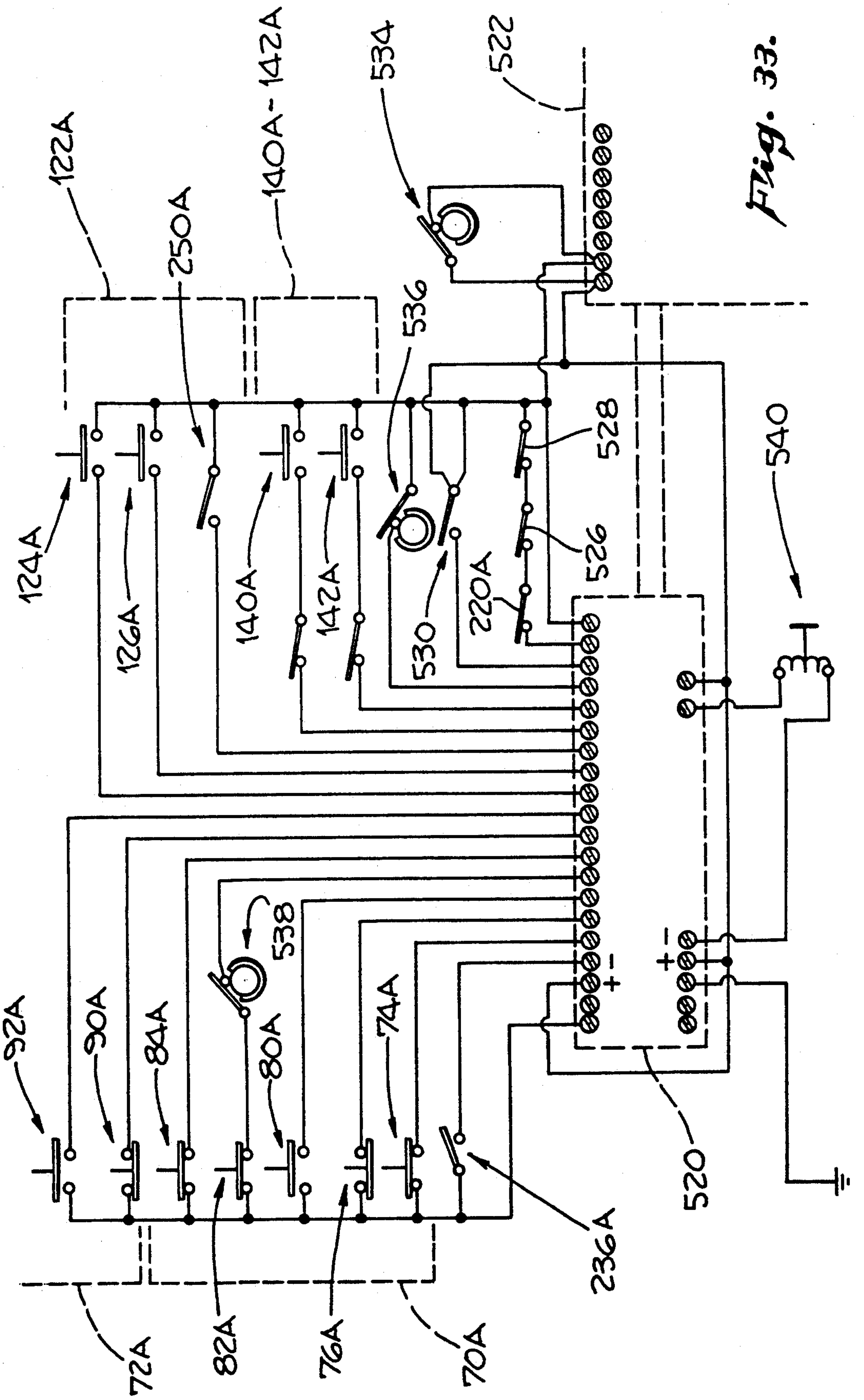
FIG. 33 is an electrical schematic of the switch and control circuits for controlling the operation of the system according to the present invention.
Figure 34:
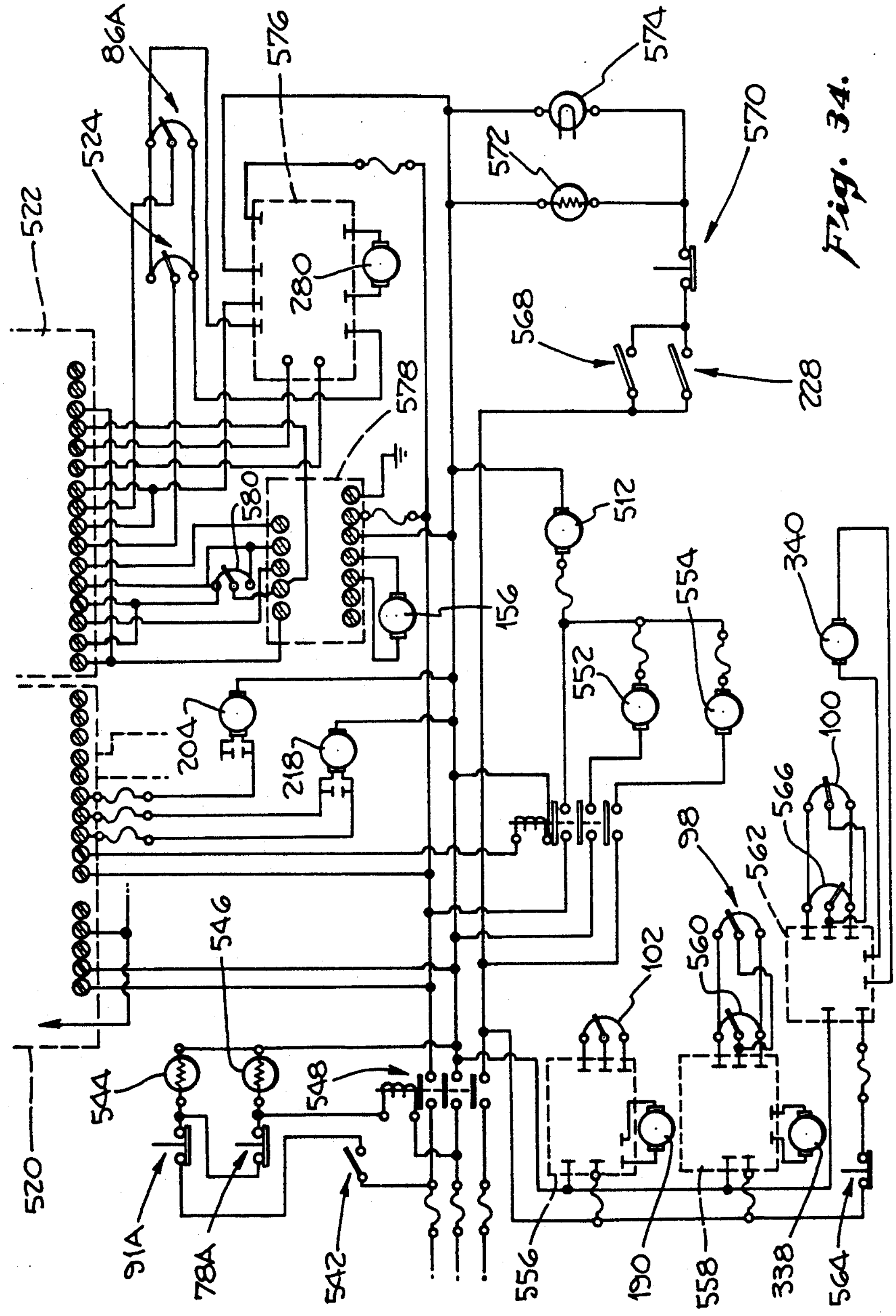
FIG. 34 is an electrical schematic representing a DC control circuit for operating and controlling various motors for running the apparatus of the present invention.

Consider now the electronic operating and control system for the machine in conjunction with FIGS. 33 and 34. The electronics are controlled by a MICRO MASTER programmable controller 520, model LS1000A coupled with a I/O expansion unit 522, model LS1004A. The inputs to the controller and the expansion unit are shown in FIG. 33 while the outputs are shown in FIG. 34. An output is also shown at the bottom of FIG. 33 for simplicity. The front operator control panel is represented at 70A and the rear operator control panel is represented at 72A. The sheet level control panel is represented at 122A and the output tray height control switches are represented at 140A and 142A. Considering the front operator control panel 70A, the run switch 74A is a normally open momentary switch. The stop switch 76A is a normally closed, maintained switch while the jog switch 80A is a normally open momentary switch. The auto registration switch 82A is a normally open momentary switch and the vacuum off switch is a normally open momentary switch. The front panel also includes the master switch 78A (FIG. 34) and the speed control potentiometer 86A (FIG. 34). A jog speed potentiometer 524 is also included on the expansion unit to control the jog speed of the machine. The jog speed potentiometer is typically set once, while the run speed potentiometer may be varied according to operating conditions.

The rear control panel includes the rear stop switch 90A which is a normally closed maintain switch and the rear jog switch 92A, which is a normally open momentary switch. The stop switches 76A and 90A are lockout switches for safety purposes, the lockout feature being programmed into the programmable controller 520. The lockout feature prevents the machine from restarting before the run switch 74A is operated.

Various switches are included for safety or control purposes to stop the machine if an unsafe condition exists or if, for example, a predetermined capacity has been reached. A normally open input tray down limit switch 236A keeps the machine from operating while the input feed tray is at the bottom of the sheet holding and feed assembly 120. The platform stop switch 220A is located under the output platform 208 (FIG. 3) and stops the machine when the output tray is full. A die door open stop switch 526 is in series with the platform stop switch 220A and is also normally closed. The die door stop switch stops the machine if the cover (not shown) over the die rolls is opened. Also in series with the platform stop switch 220A and the die door switch 526 is a gear access door stop switch 528 to stop the machine if the gear door 58 (FIG. 2) is opened. A misfeed sensor switch 530 also stops the machine, in case of a misfeed. This switch is typically used for two side lamination applications with clear laminate on the bottom laminate roll 110 (FIG. 3).

On the sheet level control panel 122A, the sheet up switch 124A is a normally open momentary switch and the sheet down switch 126A is a normally open momentary switch. The paper level switch 250A (FIG. 4) controls the operation of the jack screw.

A series of electronic cams, shown in FIG. 33, serve corresponding timing functions. The cams are mounted in a cam bank 532 (FIG. 28) and are driven by the same shaft that drives the first transmission gear 330. The first timing cam is the vacuum control cam 534 (FIG. 33) operating a normally closed switch. The vacuum control cam controls the vacuum pump (not shown) so that the pump is off until the vacuum bar is almost fully extended (to about ¼ inch above the top sheet) in the paper pick-up position to contact the leading marginal edge of the top sheet of feed stock. The cam wheel is positioned relative to the first transmission gear 330 so that the vacuum comes on when the vacuum bar makes contact with the paper. The vacuum is then maintained, as the cam wheel 334 turns with the first transmission gear 330 during that portion of the cycle where the vacuum bar picks up the leading marginal edge, retracts to the vacuum roll, carries the paper as the vacuum roll rotates the 65° and then tacks the paper onto the lower laminate. After the leading marginal edge is tacked to the lower laminate, the first transmission gear 330 and the cam wheel 534 have rotated sufficiently to cause the vacuum to be turned off simultaneously.

The second cam in the cam bank 532 is a control counting cam 536 which provides a single pulse for each cycle of the machine. The pulse is used to lower the output tray 208 as laminated sheets are output onto it, thereby maintaining the proper level for the output tray. The programmable controller is programmed such that the platform drive motor 218 (FIG. 3) draws down the output platform a predetermined amount for each block of counts produced by the control counting cam 536.

Finally, the third cam in the cam bank is an auto registration cam 538 operating a normally open switch to stop the machine when the registration mark on the labeled cutting die roll matches up with the registration mark formed on the frame of the machine. When the auto registration cam 538 has rotated sufficiently with the first transmission gear 330 such that the registration marks are aligned, the machine is stopped so that the label cutting die roll can be replaced.

The programmable controller controls a vacuum solenoid valve 540 coupled to the output circuits of the controller (FIG. 33). The remaining output circuits of the controller and the expansion unit are shown in FIG. 34. Power is supplied through several circuit breakers along a pair of 115 volt AC lines and a common line. One 115 volt AC line goes through a back cover interlock limit switch 542 to the rear master switch 91A and a rear pilot light 544. Power also goes through the front master switch 78A and a front pilot light 546 through a main contactor bank 548. Power is supplied to the various components as is apparent from the schematic of FIG. 34. Various components will now be described.

The programmable controller 520 controls the conveyor motor 204 and the output tray motor 218. The output tray motor operates in both directions, as shown by the two leads from the programmable controller.

A vacuum relay 550 provides power to an air compressor 552 and the output blower 512 and the vacuum pump 554. Power for the blower, compressor and vacuum pump are provided from line power.

Line power also drives the pull roll clutch mechanism 190 through a pull roll clutch control 556 accepting 115 volts AC and providing 0 to 90 volts DC to the clutch 190. The pull roll tension control potentiometer 102 varies the DC voltage applied to the clutch 190.

Line power also drives the top unwind brake assembly 338 (FIGS. 15 and 27) controlled through 0 to 90 volts DC supplied from a top unwind brake control circuit 558. The brake 338 is controlled first by a top unwind automatic tension control potentiometer 560 which is adjusted as the top laminate is played out (see also FIG. 15). Specifically, the pot is adjusted as the spool 106 drops down as the diameter of the roll decreases. In this way, top laminate web material is fed to the assist roll 168 at a constant angle. Downward movement of the spool moves a rack (FIG. 15) which turns a pinion, thereby adjusting the pot. As the height of the spool decreases, the braking force on the top laminate increases to account for the loss in mass of the top roll. The top laminate unwind tension potentiometer 98 allows manual adjustment of the tension for the top laminate web material.

The lower laminate brake assembly 340 (FIGS. 27 and 34) is also controlled by 0 to 90 volts DC from a bottom unwind brake control 562 powered at 115 volts AC through a bottom laminate unwind brake off switch 564. The bottom unwind control 562 is controlled by a bottom unwind automatic tension control potentiometer 566 and the bottom laminate unwind tension potentiometer 100 serving the same functions as the corresponding potentiometers described above for the top laminate roll. The potentiometer 566 is adjusted through the ride plate 226 (FIG. 3) which turns a gear, which in turn adjusts the potentiometer.

Non-critical switch include the low bottom laminate switch 228 and the top low laminate warning switch 568. A low laminate switch 570 is also included. A low laminate light 572 provides a visual indication of a low laminate condition and a low laminate warning buzzard 574 provides an audible indication.

The main drive motor 280 is driven through a main drive control 576 taking 100 volts AC at the input and providing 0 to 90 volts DC. The input tray lift motor 156 is operated at 0 to 90 volts DC provided from an input tray lift control 578. The lift motor 156 operates at a constant speed up or down when controlled by the up or down switches 124 and 126, respectively, bypassing an input tray potentiometer 580. When the input tray lift motor 156 is controlled by the paper level switch 250, the lift motor 156 is operated at a slower speed as determined by the setting on the input tray pot 580.

I claim:

1. In a laminating machine for laminating sheet material having a width together with at least one laminate web material having an adhesive coating on one side thereof, the laminating machine having upper and lower laminating means for producing therebetween a continuous laminated web comprising the sheet material and the web material fed between the laminating means, means for supplying the laminate web material to the laminating means, means for separating the continuous laminated web from the laminating means into individual laminated sheets, and means for stacking the individual laminated sheets after they are separated, the improvement comprising:

a vacuum pickup for picking up a leading marginal edge of sheet material, for assisting in moving the sheet material by the leading marginal edge to a web contact position and for pressing substantially the entire width of the leading marginal portion of a piece of sheet material to be laminated to the adhesive coating on the laminate web material; and means for holding a stack of sheet material to be laminated and having a top sheet to be dispensed on top of the stack, and means for separating the top sheet from the stack, wherein the separating means includes at least one substantially flexible protrusion mounted adjacent the stack holding means near the marginal portion of the sheet material wherein the protrusion extends at least partly over the marginal portion of the sheet material.

2. The laminating machine of claim 1 wherein the pressing means comprises a vacuum pick-up reciprocatingly pivotable between a sheet material pick-up position and a web contact position.

3. The laminating machine of claim 2 wherein the vacuum pick-up operates between the pick-up position and the web contacted position synchronized with feeding of the web material between the laminating means such that a leading marginal edge of one sheet of sheet material substantially abuts a trailing marginal edge of an immediately preceding sheet of sheet material.

4. The laminating machine of claim 3 wherein the vacuum pick-up includes a vacuum bar extendable to pick-up a leading marginal edge of sheet material and retractable to assist in moving the sheet material to the web contact position.

5. The laminating machine of claim 1 wherein the pressing means includes a vacuum bar having a sheet contact surface with a plurality of walls defining apertures in the sheet contact surface for drawing a vacuum and sucking the sheet material against the vacuum bar.

6. The laminating machine of claim 5 wherein the vacuum bar includes five apertures.

7. The laminating machine of claim 5 wherein the vacuum bar includes a rubber sheet on the sheet contact surface of the vacuum bar.

8. The laminating machine of claim 1 further comprising a programmable controller for selectively programming operating parameters for the laminating machine.

9. The laminating machine of claim 1 wherein the separating means includes means for blowing air between the top sheet and the stack.

10. The laminating machine of claim 1 wherein the separating means is mounted adjacent the stack holding means so as to be adjacent the marginal portion of the sheet material and wherein the separating means is adjustable relative to the top sheet to be closer or further away from the top sheet.

11. The laminating machine of claim 1 wherein the means for supplying the laminate web material to the laminating means includes a rotatable shaft and a brake coupled to the shaft for limiting the rotation of the shaft to tension the laminate web material.

12. The laminating machine of claim 11 wherein the brake is an electro-mechanical brake to control the speed of rotation of the shaft through variation of a current applied to the brake.

13. The laminating machine of claim 12 wherein the current applied to the electro-mechanical brake is a function of how much laminate web material has been fed to the laminating means.

14. The laminating machine Of claim 13 wherein the amount of current supplied to the electro-mechanical brake is a function of the number of times the shaft has rotated.

15. The laminating machine of claim 1 further comprising means for removing static electricity from the laminate web material.

16. The laminating machine of claim 1 wherein the stacking means includes a platform adjustably moveable up and down as a function of a number of individual laminated sheets placed on the platform, wherein the platform is lowered as a function of the number of sheets on the platform so that the sheets are always below a predetermined position, and further comprising means for blowing air over the top sheet on the stack.

17. The laminating machine of claim 16 further comprising a conveyor for moving individual laminated sheets to the stacking means and wherein the air blowing means blows air over the top sheet on the stack and below the level of the conveyor.

18. A method of laminating sheet material having a width together with at least one laminate web material having an adhesive coating on one side thereof, the method comprising the steps of:

supplying laminate web material to upper and lower laminating means;

picking up a leading marginal edge portion of a piece of sheet material by means of a vacuum pickup;

moving the piece of sheet material by the leading marginal edge portion;

pressing substantially the entire width of a marginal portion of a piece of sheet material to be laminated to the adhesive coating on the laminate web material;

passing the sheet material and the laminate web material between the upper and lower laminating means for producing therebetween a continuous laminated web comprising the sheet material and the web material fed between the laminating means;

separating the continuous laminated web from the laminating means into individual laminated sheets;

stacking the individual laminated sheets after they are separated; and holding the stack of sheet material to be laminated and having a top sheet to be dispensed on top of the stack, and separating the top sheet from the stack, wherein the top sheet is separated by at least one substantially flexible protrusion mounted adjacent the stack holding means near the marginal portion of the sheet material wherein the protrusion extends at least partly over the marginal portion of the sheet material.

19. The method of claim 18 wherein the step of pressing a marginal portion of a piece of sheet material includes the step of pressing a leading marginal edge portion adjacent a trailing marginal edge portion of an immediately preceding sheet of material so that the leading and trailing marginal edge portions are substantially abutting.

20. The method of claim 18 further comprising the step of turning one of the upper and lower laminating means at a given rate and wherein the pressing of a piece of sheet material is synchronized with the turning of the laminating means.

21. A laminating machine for laminating sheet material, having a width, together with at least one laminate web material having an adhesive coating on one side thereof, the machine comprising:

a frame;

upper and lower laminating rolls supported by the frame for producing therebetween a continuous laminated web from the sheet material and the web material when the sheet material and the web material are fed between the laminating rolls;

means supported by the frame for supplying the adhesive coated laminated web material to the laminating rolls;

means supported by the frame for holding individual sheets of sheet material such that leading marginal edges of each sheet are adjacent at least one of the laminating rolls;

a vacuum bar supported by the frame for obtaining an individual sheet of sheet material from the holding means by the leading marginal edge of the sheet material and pressing substantially the entire width of the leading marginal edge portion of the sheet of sheet material to be laminated to the adhesive coating on the laminate web material; and wherein the means for holding the sheets of material has a top sheet to be dispensed on top, and further including means for separating the top sheet from the sheets, wherein the separating means includes at least one substantially flexible protrusion mounted adjacent the sheet holding means near the marginal portion of the sheet material wherein the protrusion extends at least partly over the marginal portion of the sheet material.

22. The machine of claim 21 wherein the obtaining and pressing means includes a pickup bar reciprocatingly movable between the holding means and the laminating rolls and wherein the pickup bar presses substantially the width of the marginal portion of the sheet to the adhesive coating on the laminate web material.

23. The machine of claim 22 wherein the pickup bar presses substantially the width of the marginal portion of the sheet to the adhesive coating on the laminate web material against the lower laminating roll.

24. The machine of claim 22 wherein the pickup bar includes a connector for a vacuum hose and walls defining openings for applying a vacuum and sucking the marginal portion of the sheet against the pickup bar.

25. The machine of claim 24 wherein the pickup bar includes a longitudinally extending face, wherein the openings are formed in the face of the pickup bar and wherein the pickup bar further includes a rubber-like strip attached to the face of the bar and walls in the strip defining apertures corresponding to the openings in the pickup bar.

26. The machine of claim 24 wherein the pickup bar is mounted in a roll having an at least partial arcuate surface and wherein the pickup bar is extendable and retractable with respect to the arcuate surface.

27. The machine of claim 22 wherein the pickup bar includes means for biasing the pickup bar outwardly toward the laminate web material when the pickup bar is positioned to press the sheet to the adhesive coating.

28. The machine of claim 21 further comprising means for holding a stack of individual sheets of material to be laminated with the laminate web material, wherein at least a portion of the top sheet on the stack is exposed for being removed, and means for separating the top sheet from the stack.

29. The machine of claim 28 wherein the means for separating includes means for blowing air under the top sheet.

30. A laminating machine for laminating sheet material, having a width, together with at least one laminate web material having an adhesive coating on one side thereof, the machine comprising:

a frame;

upper and lower laminating rolls supported by the frame for producing therebetween a continuous laminated web from the sheet material and the web material when the sheet material and the web material are fed between the laminating rolls;

means supported by the frame for supplying the adhesive coated laminate web material to the laminating rolls;

means supported by the frame by holding individual sheets of sheet material such that leading marginal edges of each sheet are adjacent at least one of the laminating rolls;

a vacuum roll supported by the frame for reciprocating pivoting movement relative to the frame, including a vacuum bar extendable from and retractable to a sheet transport position and having a substantially flat vacuum surface extending a substantial width of the vacuum roll, whereby the vacuum bar is extendable to obtain an individual sheet of sheet material from the holding means by only the leading marginal edge of the sheet material and, wherein the vacuum bar is retractable to the sheet transport position carrying with it the leading marginal edge, and wherein the vacuum bar and vacuum roll are reciprocatingly pivotable such that the vacuum bar can be extended to press substantially the entire width of the leading marginal edge portion of the sheet of sheet material to be laminated to the adhesive coating on the laminate web material; and wherein the means for holding the sheets of material has a top sheet to be dispensed on top, and further including means for separating the top sheet from the sheets, wherein the separating means includes at least one substantially flexible protrusion mounted adjacent the sheet holding means near the marginal portion of the sheet material wherein the protrusion extends at least partly over the marginal portion of the sheet material.

31. The laminating material of claim 1 wherein the portion of the at least one substantially flexible protrusion which extends over the marginal portion of the sheet material is formed from a rubber-like material.

32. The laminating machine of claim 31 wherein the extending portion of the flexible protrusion extends substantially parallel to a plane defined by the sheet material.

* * * * *